(12) United States Patent
Kot et al.

(10) Patent No.: US 7,688,993 B2
(45) Date of Patent: Mar. 30, 2010

(54) SOFTWARE AND METHOD FOR EMBEDDING DATA IN TWO COLOR IMAGES

(75) Inventors: Alex Chi Chung Kot, Singapore (SG); Huijuan Yang, Singapore (SG); Jun Liu, Singapore (SG)

(73) Assignee: Nanyang Technological University, Singapore (SG)

( * ) Notice: Subject to any disclaimer, the term of this patent is extended or adjusted under 35 U.S.C. 154(b) by 1145 days.

(21) Appl. No.: 11/256,276

(22) Filed: Oct. 21, 2005

(65) Prior Publication Data

US 2007/0092102 A1 Apr. 26, 2007

(51) Int. Cl.
*G06K 9/00* (2006.01)
(52) U.S. Cl. ..................................... 382/100
(58) Field of Classification Search .................. 382/100; 713/176, 179; 380/51, 54, 201, 210, 252, 380/287; 283/72, 74–81, 85, 93, 113, 901; 370/522–529
See application file for complete search history.

(56) References Cited

U.S. PATENT DOCUMENTS

2005/0025333 A1* 2/2005 Fujii et al. .................. 382/100

OTHER PUBLICATIONS

Min Wu, Edward Tang & Bede Liu, "Data Hiding in Digital Binary Image", IEEE International Conference on Multimedia Expo., 2000, pp. 393-396.
M. Chen, E.K. Wong, N. Memon & S. Adams, "Recent Developments in Document Image Watermaking and Data Hiding", Proc. SPIE Conf. 4518: Multimedia Systems and Applications IV, pp. 166-176. Nov. 2001.

H. Yang, & Alex C. Kot, "Data Hiding for Bi-level Documents Using Smoothing Technique," Proceedings of the 2004 International Symposium on Circuits and Systems (ISCAS'04), vol. 5, pp. 692-695, May 2004.
H. Yang & Alex C. Kot, "Data Hiding for Text Document Image Authentication by Connectivity-Preserving," Proceedings of the IEEE International Conference on Acoustics, Speech, and Signal Processing, vol. 2, pp. 505-508, Mar. 18-23, 2005, Philadelphia, PA, USA.
Y. Liu, J. Mant, E. Wong and S.H. Low, "Marking and Detection of Text Documents Using Transform-domain Techniques," Proc. of SPIE, vol. 3657, Electronic Imaging (EI'99) Conf. on Security and Watermaking of Multimedia Contents, pp. 317-328, San Jose, Ca, 1999.
Haiping Lu, Xuxia Shi, Yun Q. Shi, Alex C. Kot & Lihui Chen, "Watermark Embedding in DC Components of DCT for Binary Images," The 2002 IEEE Workshop on Multimedia Signal Processing, pp. 300-303, Dec. 9-11, 2002.

(Continued)

*Primary Examiner*—Samir A. Ahmed
*Assistant Examiner*—Atiba O Fitzpatrick
(74) *Attorney, Agent, or Firm*—Dinsmore & Shohl LLP

(57) ABSTRACT

A method of embedding watermark data in a two-color image includes assessing the suitability of each of several candidate pixels to embed a bit of watermark data. Candidate pixels for which one pixel directly above, directly below, and immediately to the left and right of the candidate pixel have different colors, are identified. In one embodiment, only a single candidate pixel in each 2×2 block is identified. Suitability of each candidate pixel may be determined based on a relationship of coefficients computed from a binary wavelet or binary lifting transform formed from the image. Data is embedded by inverting suitable pixels. A recipient of the image may assess which blocks contain watermark data, by assessing the suitability of each 2×2 block in the image to embed data and extract data without further information about the data's location.

38 Claims, 21 Drawing Sheets

OTHER PUBLICATIONS

Henk J.A.M. Heijmans, and J. Goutsias, "Nonlinear Multiresolution Signal Decomposition Schemes-Part II: Morphological Wavelets," IEEE Transactions on Image Processing, vol. 9, No. 11, Nov. 2000, pp. 1897-1913.

W. Sweldens, "The Lifting Scheme: A Construction of Second Generation Wavelets," SIAM J. Math. Anal., vol. 29, pp. 511-546, 1998.

W. Sweldens, "The Lifting Scheme: A new philosophy in biorthogonal wavelet constructions," Proc. SPIE Wavelet Applications Signal Image Processing III., vol. 2569, pp. 68-79, Sep. 1995.

Jiao Zhao & Eckhard Koch, "Embedding Robust Labels Into Images for Copyright Protection", Proceedings of the Int. Congress on Intellectual Property Rights for Specialized Information, Knowledge and New Technologies, Vienna, Aug. 1995.

Min Wu & Bede Liu, "Data Hiding in Binary Image for Authentication and Annotation" IEEE Transactions on Multimedia, vol. 6, No. 4, Aug. 2004. pp. 528-538.

C. Valens, "A Really Friendly Guide to Wavelets" 1999. online:http://perso.wanadoo.fr/polyvalens/clemens/wavelets/wavelets.html.

Deepa Kundur, "Digital Watermarking for Telltale Tamper Proofing and Authentication", Proceedings of the IEEE, vol. 87, No. 7, Jul. 1999. pp. 1167-1180.

Henk J.A.M. Heijmans & John Goutsias, "Morphology-Based Perfect Reconstruction Filter Banks", Proceedings of the IEEE-SP International Symposium on Time-Frequency and Time-Scale Analysis, Pittsburgh, Pennsylvannia, Oct. 6-9, 1998.

Mitchell D. Swanson & Ahmed H. Tewfik, "A Binary Wavelet Decomposition of Binary Images" IEEE Transactions on Image Processing vol. 5, No. 12, Dec. 1996. pp. 1637-1650.

* cited by examiner

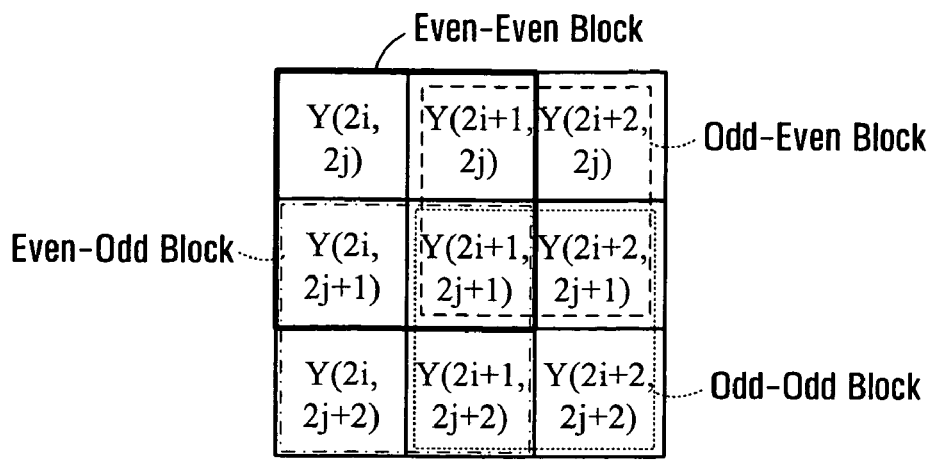
FIG. 3
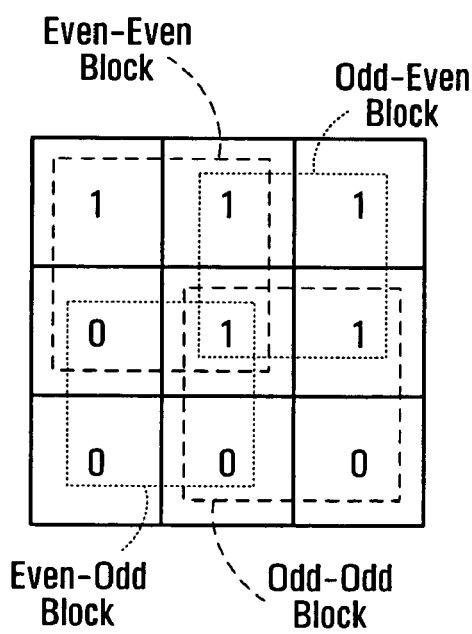
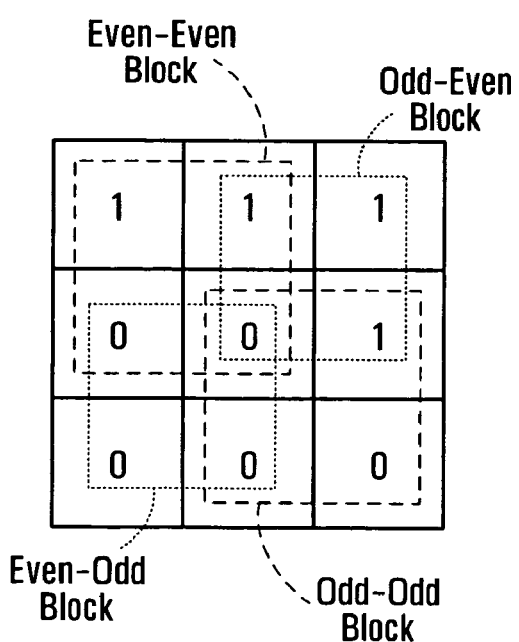
FIG. 4A  FIG. 4B

Candidate locations for Even-Even Main Processing Blocks

-------- Main Processing Block

FIG. 6A

Candidate locations for Odd-Even Main Processing Blocks

-------- Main Processing Block

FIG. 6B

Candidate locations for Even-Odd Main Processing Blocks

-------- Main Processing Block

FIG. 6C

Candidate locations for Odd-Odd Main Processing Blocks

-------- Main Processing Block

FIG. 6D

------- Even-Even Blocks
·········· Odd-Even Blocks
············ Even-Odd Blocks
----------- Odd-Odd Blocks ● Coarse Signal for Even-Even Blocks ⊘ Coarse Signal for Odd-Odd Blocks ⊕ Coarse Signal for Even-Odd Blocks ⊘ Coarse Signal for Odd-Even Blocks

FIG. 9A

------- Even-Even Blocks
·········· Odd-Even Blocks
············ Even-Odd Blocks
----------- Odd-Odd Blocks ● Coarse Signal for Even-Even Blocks ⊘ Coarse Signal for Odd-Odd Blocks ⊕ Coarse Signal for Even-Odd Blocks ⊘ Coarse Signal for Odd-Even Blocks

FIG. 9B

------ Even-Even Blocks
------ Odd-Even Blocks
······ Even-Odd Blocks
------ Odd-Odd Blocks ● Coarse Signal for Even-Even Blocks ⊘ Coarse Signal for Odd-Odd Blocks ⊕ Coarse Signal for Even-Odd Blocks ⊘ Coarse Signal for Odd-Even Blocks

FIG. 9C

------ Even-Even Blocks
------ Odd-Even Blocks
······ Even-Odd Blocks
------ Odd-Odd Blocks ● Coarse Signal for Even-Even Blocks ⊘ Coarse Signal for Odd-Odd Blocks ⊕ Coarse Signal for Even-Odd Blocks ⊘ Coarse Signal for Odd-Even Blocks

FIG. 9D

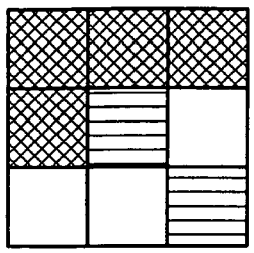
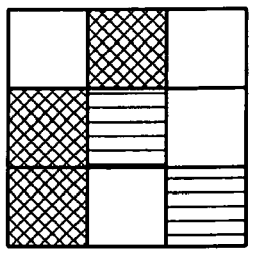
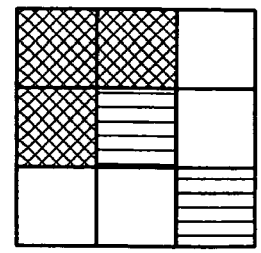
FIG. 10A     FIG. 10B     FIG. 10C
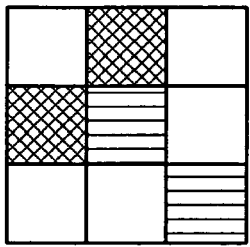
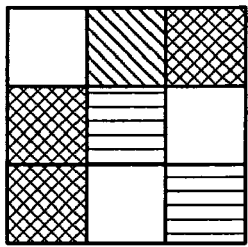
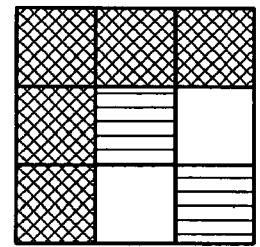
FIG. 10D     FIG. 10E     FIG. 10F
Legend: ☐ = "0"   ▨ = "1"   ▤ = Either "0" or "1"
| (i-1, j-1) $W_6$ | (i, j-1) $W_7$ | (i+1, j-1) $W_8$ |
|---|---|---|
| (i-1, j) $W_5$ | (i, j) $p$ | (i+1, j) $W_1$ |
| (i-1, j+1) $W_4$ | (i, j+1) $W_3$ | (i+1, j+1) $W_2$ |
FIG. 11

Dominant Edge Block / Pair Block

■ Black Pixel
□ White Pixel
▩ Either Black or White Pixel

■ Black Pixel
□ White Pixel
▩ Either Black or White Pixel

■ Black Pixel
□ White Pixel
▩ Either Black or White Pixel

■ Black Pixel
□ White Pixel
▩ Either Black or White Pixel

- ■ Black Pixel
- □ White Pixel
- ▩ Either Black or White Pixel

- ■ Black Pixel
- □ White Pixel
- ▩ Either Black or White Pixel

- ■ Black Pixel
- □ White Pixel
- ▩ Either Black or White Pixel

- ■ Black Pixel
- □ White Pixel
- ▩ Either Black or White Pixel

SOFTWARE AND METHOD FOR EMBEDDING DATA IN TWO COLOR IMAGES

FIELD OF THE INVENTION

The present invention relates generally to data hiding, and more particularly to embedding data in two-color (binary) images.

BACKGROUND OF THE INVENTION

The proliferation of digital media such as digital images, audio, video, and text images (documents) has generated significant interest in copyright protection, image annotation, and authentication. Watermarking (also referred to as data hiding) has been identified as a promising mechanism for copyright protection, annotation, and authentication. Watermarking promises the ability to embed inalterable watermark data directly in a digital file. At a later time, the data may be extracted to identify the origin of the digital file and verify its authenticity.

Typically, watermarking an image is achieved by changing a portion of the visible image. For example, single pixels within an image may be modified in order to transport data. Embedding watermark data in binary images, however, has presented significant challenges as arbitrarily changing pixels in such images is easily noticed.

Nevertheless, numerous data-hiding methods for embedding watermark data in binary documents have been proposed. For example, Min Wu, Edward Tang and Bede Liu, "Data Hiding in Digital Binary Image", *IEEE International Conference on Multimedia and Expo.,* 2000, pp. 393-396 proposes dividing an image into blocks, and locating the most suitable pixel within each block to embed watermark data. A list, based on the block size (for example, based on 3×3 blocks), is used to rank the pixels in blocks in order of appropriateness for inverting or "flipping" the pixel. Such ranking, however, is quite subjective and may lead to mixed results depending on the image as a whole. Therefore, pixels in the image are randomly rearranged ("shuffled") to handle uneven distribution of inverted pixels in the image. The shuffled image is divided into blocks and one bit is embedded in each block in the shuffled image by inverting the "flippable" pixels which is determined by the list. Moreover, for small blocks (e.g., 8×8 pixels), it is difficult to find a suitable shuffle key to ensure that every block in the shuffled domain has at least one "flippable" pixel. As a consequence, the final result is often not pleasing, as less than ideal pixels may be flipped in some blocks, salt-and-pepper noise, or erosion will be created in this case. On the other hand, for large block sizes (e.g.16×16) only one bit is embedded in each block and the number of "flippable" pixels available to transport the hidden data is low.

Watermarking or data hiding on binary images can be classified into several categories, e.g., fragile or semi-fragile and robustness watermarks. Based on the domain used for watermarking or data hiding, it can be categorized into spatial domain techniques and transform domain techniques.

U.S. patent application Ser. No. 10/958,033, for example, discloses a method of searching for bits within a two color image that may be inverted without perceptibly affecting the nature of the image. The method proceeds by searching for specific patterns in the image. As the method operates directly on the image without transforming the image, the technique is said to operate in image space.

Image space techniques can be generally classified into several classes: text line, word or character shifting, boundary modifications, fixed block partitioning, modification of character features, modification of run-length patterns and modification of halftone images as seen in M. Chen, E. K. Wong, N. Memon and S. Adams, "Recent Development in Document Image Watermarking and Data Hiding", Proc. SPIE Conf. 4518: Multimedia Systems and Applications IV, pp. 166-176, August 2001. An early work on data hiding for binary images which enforces the ratio of black vs. white pixels in a block to be larger or smaller than one is proposed in J. Zhao and E. Koch, "Embedding Robust Labels into Images for Copyright Protection", Proc. of the Int. Congress on Intellectual Property Rights for Specialized Information, Knowledge and New Technologies, pp. 1-10, Vienna, August 1995. A group of continuous or distributed blocks are modified by switching white pixels to black and vice versa until such thresholds are reached. Modifications of the pixels are done either on the boundary of pixels, e.g., for common text documents, or distributed throughout the whole block, e.g., for dithered images. The technique is not secure enough to be directly applied for authentication and the capacity is limited by enforcing a certain percentage of black pixels.

Several pattern-based methods are discussed in for example Min Wu, E. Tang and B. Liu, "Data Hiding in Digital Binary Image", IEEE International Conf. on Multimedia and Expo., 2000, pp. 393-396; Min Wu, and Bede Liu, "Data Hiding in Binary Images for Authentication and Annotation", IEEE Transactions on Multimedia, Vol. 6, No. 4, pp. 528-538, August 2004; H. Yang and Alex C. Kot, "Data hiding for Bi-level Documents Using Smoothing Techniques", Proceedings of the 2004 International Symposium on Circuits and Systems (ISCAS'04), Vol. 5, pp. 692-695, May 2004; and H. Yang and Alex C. Kot, "Date Hiding for Text Document Image Authentication by Connectivity-Preserving", Proceedings of the IEEE International Conference on Acoustics, Speech, and Signal Processing, Vol. 2, pp. 505-508, Mar. 18-23, 2005, Philadelphia, Pa., USA. These methods mainly look for the patterns in 3×3 or 5×5 neighborhood.

A fixed block partition method proposed by Tseng et al. (in H.-K. Pan, Y.-Y. Chen and Y.-C. Tseng, "A Secure Data Hiding Scheme for Two-Color Images," Proceedings of the Fifth Symposium on Computers and Communications, pp. 750-755, Jul. 3-6, 2000.) uses a secret key and a weight matrix to protect the hidden data. Given an image with block size of m×n, the scheme can hide as many as $\lfloor \log_2(mn+1) \rfloor$ bits of data. However, the visual effects of the scheme are poor because of the randomness in choosing the locations for flipping. The watermarked document appears to be noisy.

Other embedding techniques require an image to be transformed from image space into some other space. An early investigation of combined spatial and frequency domain approach is proposed by Y. Liu, J. Mant, E. Wong and S. H. Low, "Marking and Detection of Text Documents Using Transform-domain Techniques"; Proc. of SPIE, vol. 3657, Electronic Imaging (EI'99) Conf. on Security and Watermarking of Multimedia Contents, pp. 317-328, San Jose, Calif., 1999, in which the watermark embedding is done in spatial domain by using the line or word shifting method whereas the watermark detection is done in frequency domain by using Cox et al.'s method. The idea is based on the observation that the watermarking effect on text document images in frequency domain is more obtrusive than pictorial image. It always creates a "dirty" background. "Cleaning" the background by thresholding light grays to white renders the watermark less obtrusive but also sharply reduces the detector response.

A further investigation of watermarking on binary images based discrete cosine transform DC components is proposed in H. Lu, X. Shi, Shi, Y. Q., Kot A. C. and L. Chen, "Watermark embedding in DC Components of DCT for binary images", The 2002 IEEE Workshop on Multimedia Signal Processing, pp. 300-303, 9-11, Dec. 2002. A preprocessing step of blurring and a post-processing step of biased binarization are required in order to embed the watermark successfully into the binary image. However, the experimental results show that the watermarked image has poor quality due to the pre-blurring and post-binarization process.

All of these techniques present their own benefits and disadvantages. As such, there is a need for other techniques of embedding data in two color images.

SUMMARY OF THE INVENTION

In accordance with an aspect of the present invention, pixels within a binary (two-color) image are identified as invertible in order to embed a bit of data in the image. A candidate pixel is identified as invertible if,
  (i) the pixel directly above the candidate pixel and the pixel directly below the candidate pixel have different colors;
  (ii) the pixel immediately to the left of the candidate pixel and the pixel immediately to the right of the candidate pixel have different colors; and
  (iii) the pixel is not horizontally or vertically adjacent to another invertible pixel.
A variety of transforms may be used to identify such pixels.

In accordance with an aspect of the present invention, there is provided a method comprising, designating a plurality of pixels within a two color image as candidate pixels; identifying as invertible, all of the candidate pixels for which, one pixel directly above the candidate pixel and one pixel directly below the candidate pixel have different colors; and one pixel immediately to the left of the candidate pixel and one pixel immediately to the right of the candidate pixel have different colors.

In accordance with another aspect of the present invention, there is provided a method of assessing if candidate pixels at locations $(2i+1, 2j+1)$ in a two color image represented as $Y(m,n)$ may be inverted. The method includes forming an array $HL_{oe}(i,j)=Y(2i+1, 2j+1) \oplus Y(2i+2, 2j+1)$, having one entry for each of the candidate pixels; forming an array $HL_{ee}(i,j)=Y(2i, 2j+1) \oplus Y(2i+1, 2j+1)$, having one entry for each of the candidate pixels; forming an array $LH_{ee}(i,j)=Y(2i+1, 2j) \oplus Y(2i+1, 2j+1)$, having one entry for each of the candidate pixels; forming an array $LH_{eo}(i,j)=Y(2i+1, 2j+1) \oplus Y(2i+1, 2j+2)$, having one entry for each of the candidate pixels; assessing values of $(i,j)$ for which $(HL_{ee}(i,j) \oplus HL_{oe}(i,j))\char`\^(LH_{ee}(i,j) \oplus LH_{eo}(i,j))=1$ to identify invertible pixels in the image.

In accordance with another aspect of the present invention, there is provided a method of assessing if candidate pixels at locations $(2i, 2j)$ in a two color image represented as $Y(m,n)$ may be inverted. The method includes forming an array $HL_{oo}(i-1,j-1)=Y(2i-1, 2j) \oplus Y(2i, 2j)$, having one entry for each of the candidate pixels; forming an array $HL_{eo}(i,j-1)=Y(2i, 2j) \oplus Y(2i+1, 2j)$, having one entry for each of the candidate pixels; forming an array $LH_{oo}(i-1,j-1)=Y(2i, 2j-1) \oplus Y(2i, 2j)$, having one entry for each of the candidate pixels; forming an array $LH_{oe}(i-1,j)=Y(2i, 2j) \oplus Y(2i, 2j+1)$, having one entry for each of the candidate pixels; assessing values of $(i,j)$ for which $(HL_{oo}(i-1,j-1) \oplus HL_{ee}(i,j-1))\char`\^(LH_{oo}(i-1,j-1) \oplus LH_{oe}(i-1,j))=1$ to identify invertible pixels in the image.

In accordance with yet another aspect of the present invention, there is provided a method of assessing if candidate pixels at locations $(2i, 2j)$ in a two color image represented as $Y(m,n)$ may be inverted. The method includes forming an array $HL_{L\ ee}(i,j)=Y(2i-1,2j) \oplus Y(2i+1,2j)$, having one entry for each of said candidate pixels; forming an array $LH_{L\ ee}(i,j)=Y(2i,2j-1) \oplus Y(2i,2j+1)$, having one entry for each of the candidate pixels; assessing values of $(i,j)$ for which $HL_{Lee}(i,j) \oplus LH_{Lee}(i,j)=1$ to identify invertible pixels in the image.

In accordance with yet another aspect of the present invention, there is provided a method of assessing if candidate pixels at locations $(2i+1, 2j+1)$ in a two color image represented as $Y(m,n)$ may be inverted. The method includes forming an array $LH_{L\ oo}(i,j)=Y(2i+1,2j) \oplus Y(2i+1,2j+2)$, having one entry for each of the candidate pixels; forming an array $HL_{L\ oo}(i,j)=Y(2i,2j+1) \oplus Y(2i+2,2j+1)$, having one entry for each of the candidate pixels; assessing values of $(i,j)$ for which $HL_{Loo}(i,j) \oplus LH_{Loo}(i,j)=1$ to identify invertible pixels in the image.

In accordance with yet another aspect of the present invention, there is provided a method of assessing if candidate pixels at locations $(2i, 2j)$ and $(2i+1, 2j+1)$ within a two color images that may be represented as an array $Y(m,n)$ may be inverted. The method includes forming an array $HL_{L\ ee}(i,j)=Y(2i-1,2j) \oplus Y(2i+1,2j)$, having one entry for each of the candidate pixels; forming an array $LH_{L\ ee}(i,j)=Y(2i,2j-1) \oplus Y(2i,2j+1)$, having one entry for each of the candidate pixels; forming an array $LH_{L\ oo}(i,j)=Y(2i+1,2j) \oplus Y(2i+1,2j+2)$, having one entry for each of the candidate pixels; forming an array $HL_{L\ oo}(i,j)=Y(2i,2j+1) \oplus Y(2i+2,2j+1)$, having one entry for each of the candidate pixels; assessing values of $(i,j)$ for which $HL_{Loo}(i,j) \oplus LH_{Loo}(i,j)=1$; or $HL_{Lee}(i,j) \oplus LH_{Lee}(i,j)=1$ to identify invertible pixels within the image.

In accordance with yet another aspect of the present invention, there is provided a method of transforming of a binary image, comprising: sub-sampling pixels of the image at regular intervals to form a coarse signal; forming a vertical detail signal by calculating the difference of pixels which is to the left or right of the pixels that has been sub-sampled to form the coarse signal; forming a horizontal detail signal by calculating the difference of pixels above or below each of the pixels that has been sub-sampled to form the coarse signal; forming a diagonal detail signal by calculating the difference of the sub-sampled pixels and its horizontally, vertically and diagonally connected neighbors.

In accordance with yet another aspect of the present invention, there is provided a method of calculating an invertible transform of an M×N binary image that may be represented as an array $Y(m,n)$, comprising a coarse signal s, a vertical detail signal v, a horizontal detail signal h and a diagonal detail signal d. The method includes calculating $s(i,j)=Y(2i+1, 2j+1)$; calculating $v(i,j)=Y(2i, 2j+1) \oplus Y(2i+1, 2j+1)$; calculating $h(i,j)=Y(2i+1, 2j) \oplus Y(2i+1, 2j+1)$; calculating $d(i,j)=Y(2i, 2j) \oplus Y(2i+1, 2j) \oplus Y(2i, 2j+1) \oplus Y(2i+1, 2j+1)$ for all integer values of i,j, $i<M/2$, and $j<N/2$.

In accordance with yet another aspect of the present invention, there is provided a method of transforming a plurality of pixels s, h, v, d into a single image Y having pixels $Y(m,n)$. The method includes,
  a. computing the value $Y(m,n)$ according to the formula $Y(m,n)=s(m/2,n/2) \oplus v(m/2,n/2) \oplus h(m/2,n/2) \oplus d(m/2,n/2)$ when m is even and n is even.
  b. computing the value $Y(m,n)$ according to the formula $Y(m,n)=s(m/2,n-1/2) \oplus v(m/2,n-1/2)$ when m is even and n is odd.
  c. computing the value $Y(m,n)$ according to the formula $Y(m,n)=s(m-1/2,n/2) \oplus h(m-1/2,n/2)$ when m is odd and n is even.
  d. computing the value $Y(m,n)$ according to the formula $Y(m,n)=s(m-1/2,n-1/2)$ when m is odd and n is odd In accordance with yet another aspect of the present invention, there is provided a method of calculating an invertible transform of an M×N binary image that may be represented as an array Y(m,n). The method includes, calculating $s_{oe}(i,j)=Y(2i+2,2j+1)$ calculating $v_{oe}(i,j)=Y(2i+1,2j+1) \oplus Y(2i+2,2j+1)$ calculating $h_{oe}(i,j)=Y(2i+2,2j) \oplus Y(2i+2,2j+1)$ calculating $d_{oe}(i,j)=Y(2i+1,2j) \oplus Y(2i+2,2j) \oplus Y(2i+1,2j+1) \oplus Y(2i+2,2j+1)$ for all integer values of i,j, i<M/2, and j<N/2.

In accordance with yet another aspect of the present invention, there is provided a method of calculating an invertible transform of an M×N binary image that may be represented as an array Y(m,n). The method includes, calculating $s_{oo}(i,j)=Y(2i+2,2j+2)$ calculating $v_{oo}(i,j)=Y(2i+1,2j+2) \oplus Y(2i+2,2j+2)$ calculating $h_{oo}(i,j)=Y(2i+2,2j+1) \oplus Y(2i+2,2j+2)$ calculating $d_{oo}(i,j)=Y(2i+1,2j+1) \oplus Y(2i+2,2j+1) \oplus Y(2i+1,2j+2) \oplus Y(2i+2,2j+2)$ for all integer values of i,j, i<M/2, and j<N/2.

In accordance with yet another aspect of the present invention, there is provided a method of transforming of a binary image, comprising: sub-sampling pixels of the image at regular intervals to form a coarse signal; forming a vertical detail signal by calculating the difference of two pixels horizontally adjacent each of the pixels that has been sub-sampled to form the coarse signal; forming a horizontal detail signal by calculating the difference of two pixels above and below each of the pixels that has been sub-sampled to form the coarse signal; forming a diagonal detail signal by calculating the difference of four samples, which are diagonally connected to each of the pixels that has been sub-sampled to form the coarse signal.

In accordance with yet another aspect of the present invention, there is provided a method of transforming an M×N binary image that may be represented as an array Y(m,n) into an alternative representation comprising a coarse signal s, a vertical detail signal v, a horizontal detail signal h and a diagonal detail signal d. The method includes computing s(i,j) from pixels Y(i,j) of the image according to the formula:

$s(i,j)=Y(2i,2j) \oplus [Y(2i-1,2j) \oplus Y(2i+1,2j) \oplus Y(2i,2j-1) \oplus Y(2i,2j+1)]$; computing the vertical signal v(i,j) from the pixels Y(i,j) of the image according to the formula:

$v(i,j)=Y(2i-1,2j) \oplus Y(2i+1,2j)$; computing the horizontal signal h(i,j) from the pixels Y(i,j) of the image according to the formula:

$h(i,j)=Y(2i,2j-1) \oplus Y(2i,2j+1)$; and computing the diagonal signal d(i,j) from pixels Y(i,j) of the image Y according to the formula $d(i,j)=Y(2i-1,2j-1) \oplus Y(2i+1,2j-1) \oplus Y(2i-1,2j+1) \oplus Y(2i+1,2j+1)$ In accordance with yet another aspect of the present invention, there is provided a method of transforming a plurality of pixels s, h, v, d into a single image Y having pixels Y(m,n). The method includes computing the value Y(m,n) according to the formula $Y(m,n)=s(m/2,n/2) \oplus [v(m/2,n/2) \oplus h(m/2,n/2)]$ when m is even and n is even; computing the value Y(m,n) according to the formula $Y(m,n)=h(m/2,n-1/2) \oplus Y(m,n-2)$ when m is even and n is odd; computing the value Y(m,n) according to the formula $Y(m,n)=v(m-1/2,n/2) \oplus Y(m-2,n)$ when m is odd and n is even; computing the value Y(m,n) according to the formula $Y(m,n)=d(m-1/2,n-1/2) \oplus Y(m-2,n-2) \oplus Y(m-2,n) \oplus Y(m,n-2)$ when m is odd and n is odd.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

FIG. 3 is a graphical representation of a 3×3 portion of a rasterized source image source;

FIGS. 4A-4B are graphical representations of a 3×3 pixel block of an image source, including a candidate center pixel suitable for embedding data and further illustrating the results of inverting the candidate pixel;

FIGS. 6A-6D shows the four sets of candidate locations.

FIGS. 9A-9D shows the four possible locations that the coarse signal may take for different main processing 2×2 blocks.

FIGS. 10A-10F are examples of 3×3 blocks including a candidate center pixel suitable for embedding data in manners exemplary of an embodiment of the present invention;

FIG. 11 shows the designations of pixels in a 3×3 block.

DETAILED DESCRIPTION

Figure 1:
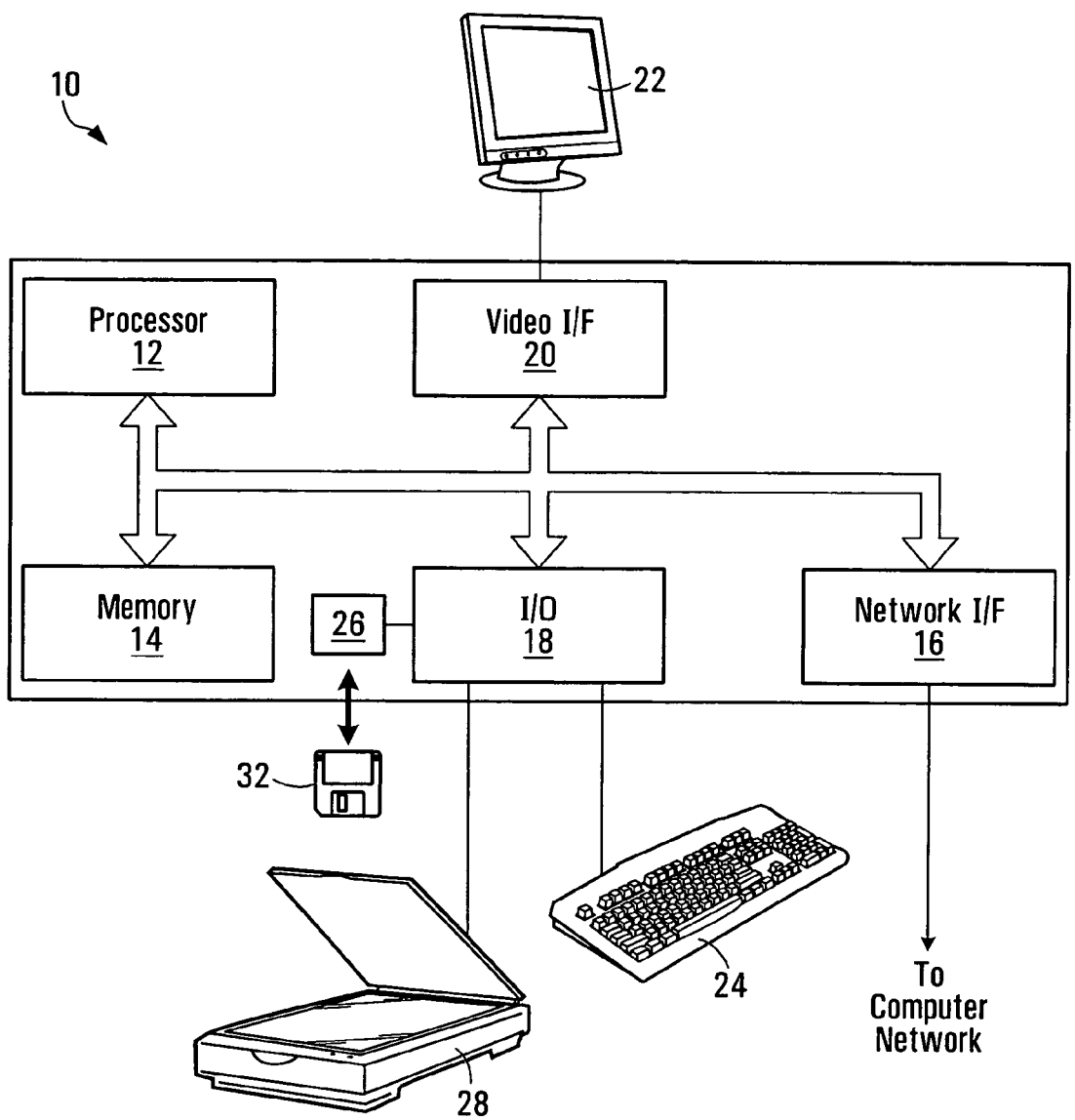
FIG. 1 is simplified schematic diagram of a general purpose computing including software exemplary of the present invention executes.

FIG. 1 illustrates a general purpose computing device 10 storing and executing software exemplary of embodiments of the present invention. In the illustrated embodiment, device 10 is a conventional network capable multimedia computing device. Device 10 could, for example, be an Intel x86 based computer acting as a Microsoft Windows NT/XP/2000, Apple, or Unix based workstation, personal computer, or the like. Example device 10 includes a processor 12, in communication with computer storage memory 14; data network interface 16; input output interface 18; and video adapter 20. As well, device 12 includes a display 22 interconnected with video adapter 20; and several input/output devices, such as a keyboard 24 and disk drive 26, a document scanner 28, and a mouse (not shown) or the like.

Processor 12 is typically a conventional central processing unit and may for example be a microprocessor in the Intel x86 family. Of course, processor 12 could be any other suitable processor known to those skilled in the art. Computer storage memory 14 includes a suitable combination of random access memory, read-only memory, and disk storage memory used by device 10 to store and execute software programs adapting device 14 to function in manners exemplary of the present invention. Drive 26 is capable of reading and writing data to or from a computer-readable medium 32 used to store software to be loaded into memory 14. Computer-readable medium 32 may be a CD-ROM, DVD-ROM diskette, tape, ROM-Cartridge, or the like. Network interface 16 is any interface suitable to physically link device 12 to a computer or communications network. Interface 16 may, for example, be an Ethernet, ATM, ISDN interface, or modem that may be used to pass data from and to convention computer network (such as a local area network (LAN), wide area network (WAN), or the public internet), or another suitable communications network.

Computing device 10 stores software capable of embedding data into a two-color document in manners exemplary of embodiments of the present invention. As will become apparent, the software assesses whether each of multiple designated candidate pixels lends itself to embedding a bit of data, by inverting (also referred to as flipping) the candidate bit; and embeds data in those candidate pixels that are assessed as "watermarkable" or "invertible". In the disclosed embodiment, each candidate pixel is evaluated as invertible or not, by assessing whether or the candidate pixel may be modified without visually altering a block including the pixel and neighbouring pixels, in a way that is likely material to a human observer.

Complementary software capable of extracting watermark data from received documents may also be stored at device 10.

Exemplary of an embodiment of the present invention computing device 10 uses frequency analysis techniques in order to identify candidate within the two-color image suitable for embedding data. Specifically, forms of wavelet transforms may be used in order to identify such blocks within an image that lend themselves to the embedding of data.

Wavelet transforms generally, and wavelet image transforms are disclosed in R. C. Gonzalez, and R. E. Woods, *Digital Image Processing*, 2nd Ed., New Jersey: Prentice-Hall Inc., 2002. For binary images, an analogous transform—named the binary wavelet transform—has been proposed by Swanson et al. in M. D. Swanson and A. H. Tewfik, "A Binary Wavelet Decomposition of Binary Images", IEEE Transactions on Image Processing, Vol. 5, No. 12, pp. 1637-1650, December 1996. The morphological wavelet transform is proposed by Henk J. A. M. Heijmans, and J. Goutsias, "Non-linear Multiresolution Signal Decomposition Schemes-Part II: Morphological Wavelets", IEEE Transactions on Image Processing, Vol. 9, No. 11, November 2000. In exemplary embodiments, conventional morphological binary wavelet transforms for 1-D signal to 2-D signal are extended: interlaced morphological binary wavelet transform are used to track transitions in binary images and hence binary image data hiding. In an alternate embodiment, a prediction and update lifting transform is constructed for the binary image data hiding purpose.

The binary wavelet transform uses simple modulo-2 operations, yet shares many of the characteristics of the conventional image wavelet transform.

Generally, a modulo-2 wavelet transform sub-samples a modulo-2 signal, and also forms the difference between the sub-sampled samples and their adjacent samples. Resulting values of the transformed signal remain modulo-2. The sub-sampled and difference signals are referred to as coarse and detail signals, respectively.

The coarse signal s and the detail signal d may be formed as $$s(i)=Y(2i+1) \tag{1}$$

$$d(i)=Y(2i) \oplus Y(2i+1) \tag{2}$$

where Y represents the set of samples at level j which takes binary value 0s and 1s, and s represents the transformed (sampled) coarse signal, and d represents the detail signal at level j+1. i is the index of the coarse and detail signals s and d, i=0, 1, 2, ... (N−1)/2 for a 1-D signal of size N, N ∈ Z and N is and odd number. s(i) and d(i) are the coarse and detail coefficients respectively.

The original signal may be reconstructed from the coarse and detail coefficients, $$Y(i)=s((i-1)/2), i \bmod 2=1 \tag{3}$$

$$Y(i)=s(i/2) \oplus d(i/2), i \bmod 2=0 \tag{4}$$

Notably, the coarse signal s actually takes every odd sample of the original signal Y. The detail signal, d, is the XOR (or difference) of two neighbouring odd and even samples. The detail signal d(i) contains 1s only at a transition, e.g., from 0 to 1 or vice versa, in signal Y that occurs at an odd point.

The 1-D wavelet transform can be extended to two or higher dimensions. For example, the 1-D wavelet transform may be sequentially applied to the rows and columns of a 2-D image.

Generally, a 2-D modulo-2 wavelet transform sub-samples the 2-D modulo-2 signal, and also forms the difference between adjacent samples. As the signal is 2 dimensional, it is sub-sampled both vertically and horizontally. Typically, one pixel in each 2×2 block of pixels in the image is sub-sampled, to form the coarse version s of the original signal Y.

Additionally, the difference between the sub-sampled pixel and its vertical, horizontal, and diagonal (includes diagonal and anti-diagonal directions) neighbours are calculated. As differences between horizontal pixels reveal vertical detail in the original image, and differences between vertical pixels reveal horizontal details, the signals formed from differences between horizontal and vertical neighbouring pixels are often referred to as the vertical and horizontal detail signals, respectively. Again, resulting values of the transformed signal remain modulo-2. Notably, the coarse signal s and the difference signals will each be ¼ the size of the original signal, Y. Further, the transform is lossless. As such, the transform is often reapplied to the coarse portion of an already transformed signal to produce higher level wavelet transforms.

Figure 2A:
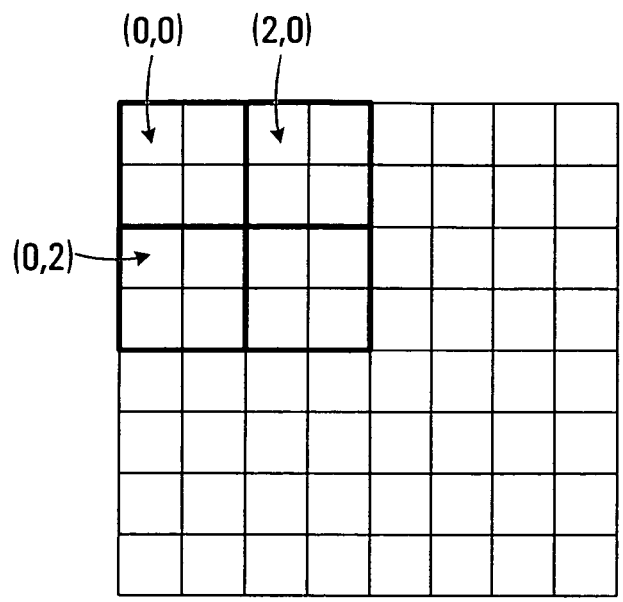
FIGS. 2A-2D are graphical representations of a rasterized source image with specific 2×2 processing blocks highlighted.
Figure 2B:
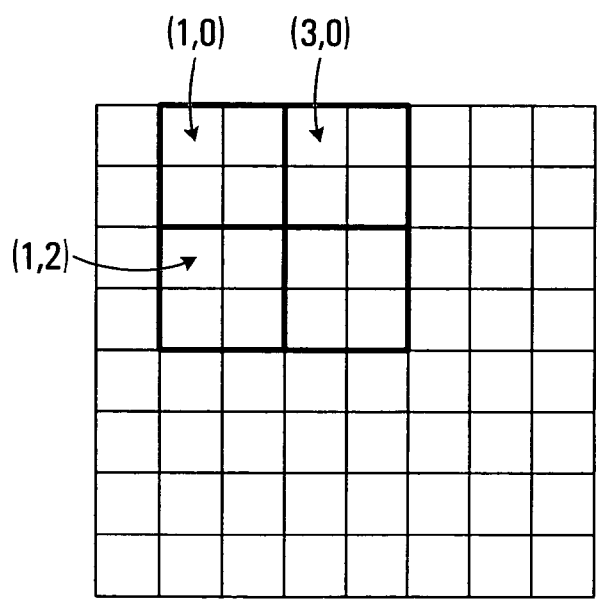
Figure 2C:
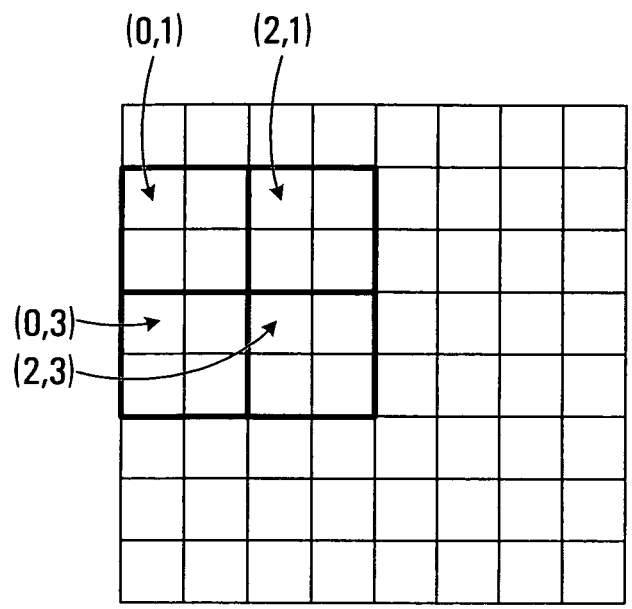
Figure 2D:
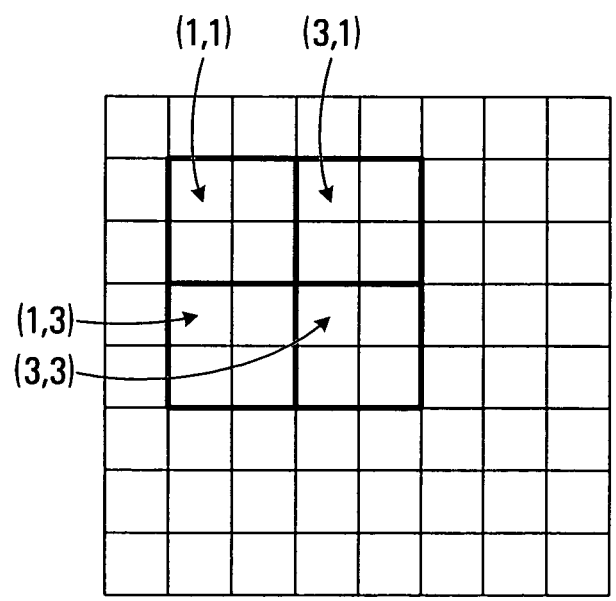
Figure 5A:
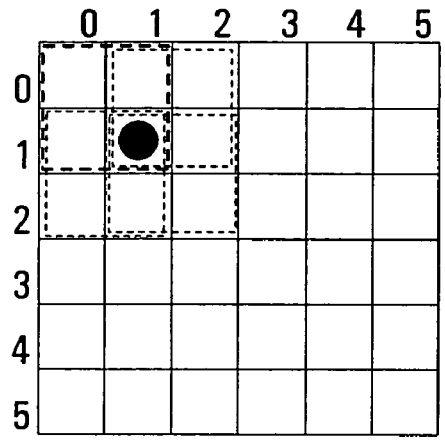
FIGS. 5A-5D shows the four combinations of the main processing 2×2 block and its surrounding three 2×2 blocks.
Figure 5B:
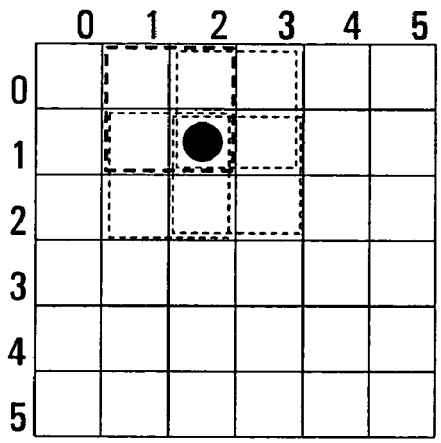
Figure 5C:
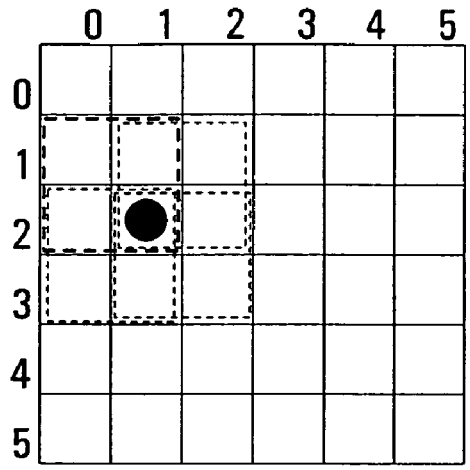
Figure 5D:
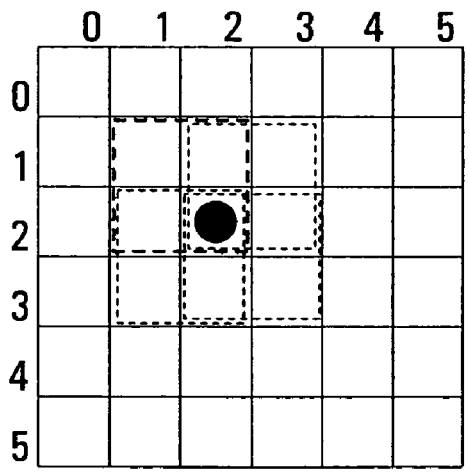

Mathematically, a 2-D non-separable transform can be defined. If m, n represent the index of the signal Y(m,n), m=0, 1, 2, ..., M−1 and n=0, 1, 2, ..., N−1, M and N are integers and odd. The location of the points in a 2×2 pixel block within signal Y(m,n) is shown in FIG. 2A.

Operators to form the coarse sub-sampled image s(i,j) and the vertical, horizontal and diagonal detail signals, may be defined as $$s(i,j) = Y(2i+1, 2j+1) \quad (5)$$

$$v(i,j) = Y(2i, 2j+1) \oplus Y(2i+1, 2j+1) \quad (6)$$

$$h(i,j) = Y(2i+1, 2j) \oplus Y(2i+1, 2j+1) \quad (7)$$

$$d(i,j) = Y(2i, 2j) \oplus Y(2i+1, 2j) \oplus Y(2i, 2j+1) \oplus Y(2i+1, 2j+1) \quad (8)$$

where, i and j are the index of the coarse signal, i=0, 1, ..., (M−1)/2 and j=0, 1, ..., (N−1)/2. s(i,j), v(i,j), h(i,j) and d(i,j) represent, respectively, the coarse, vertical, horizontal and diagonal detail signals of the signal Y.

The original signal Y(m,n) may thus be reconstructed from the coarse s, and vertical, horizontal and diagonal signals v, h, and d as $$Y(m, n) = s\left(\frac{m}{2}, \frac{n}{2}\right) \oplus v\left(\frac{m}{2}, \frac{n}{2}\right) \oplus h\left(\frac{m}{2}, \frac{n}{2}\right) \oplus d\left(\frac{m}{2}, \frac{n}{2}\right) \quad (9)$$
$$\begin{cases} m \bmod 2 = 0 \\ n \bmod 2 = 0 \end{cases}$$

$$= s\left(\frac{m}{2}, \frac{n-1}{2}\right) \oplus v\left(\frac{m}{2}, \frac{n-1}{2}\right) \begin{cases} m \bmod 2 = 0 \\ n \bmod 2 = 1 \end{cases} \quad (10)$$

$$= s\left(\frac{m-1}{2}, \frac{n}{2}\right) \oplus h\left(\frac{m-1}{2}, \frac{n}{2}\right) \begin{cases} m \bmod 2 = 1 \\ n \bmod 2 = 0 \end{cases} \quad (11)$$

$$= s\left(\frac{m-1}{2}, \frac{n-1}{2}\right) \begin{cases} m \bmod 2 = 1 \\ n \bmod 2 = 1 \end{cases} \quad (12)$$

The four signal components of an original signal s(i,j), v(i,j), h(i,j) and d(i,j) are often respectively referred to as the LL, HL, LH and HH components of the signal.

Of note, the transform defined in Eq. (5)-(8) for 2-D signal, starts from an even coordinate within the source signal. So, this transform may be referred to as an "even-even" transform. Any one of the four pixels in the 2×2 block may be sub-sampled. In the depicted embodiment, the bottom right pixel in each block is sub-sampled. The horizontal, vertical and diagonal detail signal can be calculated by computing XOR of the vertical, horizontal and diagonal neighboring pixels and the subsampled pixels. The location of 2×2 blocks within an image is illustrated in FIG. 2A. That is, 2×2 blocks at odd row and odd column addresses within the original signal are sub-sampled. As a result, the transitions from even to odd co-ordinates may easily be assessed from the difference signals, v, h, and d. However, transition information from odd co-ordinates to even co-ordinates may not be so easily assessed.

This provides motivation to design complementary wavelet transforms operating at odd co-ordinates of the original signal. For 1-D signal, the computation of a complementary transform starts with odd numbered samples.

The resulting transforms may be defined as, $$s(i) = Y(2i+2) \quad (13)$$

$$d(i) = Y(2i+1) \oplus Y(2i+2) \quad (14)$$

For a 2-D signal, several possibilities exist. Each 2×2 block of pixels within the image may be classified based on its absolute co-ordinates within the original image. An even-even block is a 2×2 block whose starting co-ordinate (i.e. top left) corresponds to an even numbered row and column in the image. An even-odd block is a 2×2 block whose starting co-ordinate corresponds to an even numbered column and an odd numbered row. An odd-even block is a 2×2 block whose starting co-ordinate corresponds to an odd numbered column and an even numbered row and an odd-odd block is a 2×2 block whose starting co-ordinate corresponds to an odd numbered column and an odd numbered row. The location of even-even, odd-even, even-odd, and odd-odd 2×2 blocks within an image are depicted in FIGS. 2A-2D, respectively.

By sub-dividing each image into even-odd 2×2 blocks, odd-even 2×2 blocks and odd-odd 2×2 blocks, three additional transforms may be defined. Again, for each subdivided image, one pixel in each 2×2 block is sub-sampled to form a coarse representation of the image. Horizontal, vertical and diagonal difference signals may be formed, relative to the sub-sampled pixels. Again, the coarse signal may be formed by sub-sampling the bottom right most pixel of each block. Difference signals are formed with reference to this sub-sampled pixel.

Using the absolute co-ordinates of the image, one may thus define the odd-even binary wavelet transform for 2-D signal where $s_{oe}(i,j)$, $h_{oe}(i,j)$, $v_{oe}(i,j)$ and $d_{oe}(i,j)$ represent the coarse signal, horizontal, vertical and diagonal detail signals, respectively. The even-odd binary wavelet transform and odd-odd binary wavelet transform may be similarly defined, using 2×2 blocks whose starting co-ordinates are even,odd, and odd,odd respectively.

Expressed mathematically, for the odd-even transform, $$s_{oe}(i,j) = Y(2i+2, 2j+1) \quad (15)$$

$$v_{oe}(i,j) = Y(2i+1, 2j+1) \oplus Y(2i+2, 2j+1) \quad (16)$$

$$h_{oe}(i,j) = Y(2i+2, 2j) \oplus Y(2i+2, 2j+1) \quad (17)$$

$$d_{oe}(i,j) = Y(2i+1, 2j) \oplus Y(2i+2, 2j) \oplus Y(2i+1, 2j+1) \oplus Y(2i+2, 2j+1) \quad (18)$$

For the even-odd transform, $$s_{eo}(i,j) = Y(2i+1, 2j+2) \quad (19)$$

$$v_{eo}(i,j) = Y(2i, 2j+2) \oplus Y(2i+1, 2j+2) \quad (20)$$

$$h_{eo}(i,j) = Y(2i+1, 2j+1) \oplus Y(2i+1, 2j+2) \quad (21)$$

$$d_{eo}(i,j) = Y(2i, 2j+1) \oplus Y(2i+1, 2j+1) \oplus Y(2i, 2j+2) \oplus Y(2i+1, 2j+2) \quad (22)$$

For the odd-odd transform, $$s_{oo}(i,j) = Y(2i+2, 2j+2) \quad (23)$$

$$v_{oo}(i,j) = Y(2i+1, 2j+2) \oplus Y(2i+2, 2j+2) \quad (24)$$

$$h_{oo}(i,j) = Y(2i+2, 2j+1) \oplus Y(2i+2, 2j+2) \quad (25)$$

$$d_{oo}(i,j) = Y(2i+1, 2j+1) \oplus Y(2i+2, 2j+1) \oplus Y(2i+1, 2j+2) \oplus Y(2i+2, 2j+2) \quad (26)$$

To simplify the notation $LL_{ee}(i,j) = s_{ee}(i,j)$, $HL_{ee} = v_{ee}(i,j)$, $LH_{ee}(i,j) = h_{ee}(i,j)$ and $HH_{ee}(i,j) = d_{ee}(i,j)$ are used to represent the coarse, vertical, horizontal and diagonal detail signals obtained from the transform using even-even blocks. $LL_{oe}(i,j)$, $HL_{oe}(i,j)$, $LH_{oe}(i,j)$ and $HH_{oe}(i,j)$ may similarly be used to represent the coarse, vertical, horizontal and diagonal detail signals obtained from transform using odd-even blocks; $LL_{eo}(i,j)$, $HL_{eo}(i,j)$, $LH_{eo}(i,j)$ and $HH_{eo}(i,j)$ for even-odd blocks; $LL_{oo}(i,j)$, $HL_{oo}(i,j)$, $LH_{oo}(i,j)$ and $HH_{oo}(i,j)$, for odd-odd blocks.

As should now be appreciated, any 3×3 block within the original image contains one even-even 2×2 block, one even-odd 2×2 block, one odd-even 2×2 block and one odd-odd 2×2 block. This is illustrated in FIG. 3. The changes in the pixels of different types of blocks by flipping the center pixels in a 3×3 neighborhood may be appreciated with reference to FIG. 4A and FIG. 4B. Notably, inverting a pixel in one 2×2 block affects its neighboring three 2×2 blocks which surrounds this pixel. For example, inverting pixels in the lower right corner of even-even blocks will cause changes to the even-odd blocks, the odd-even blocks and the odd-odd blocks. This will reflect in changes of the transform coefficients, e.g., $HL_{oe}$ and $LH_{eo}$.

In one embodiment, the above described transforms may be used for hiding data in binary images. This, in turn, allows hiding of data suitable for the authentication of the binary images. The basic idea in the data-hiding scheme is based on the observations that data may be inconspicuously embedded in a binary image by flipping or inverting pixels along edges of an image. Flipping an edge pixel in the binary image is equivalent to shifting the edge location horizontally one pixel to the left or right, and vertically one pixel up or down. This is illustrated in FIGS. 4A and 4B.

So, the horizontal edge LH and vertical edge HL can be used to track the transition along the vertical and horizontal directions, and to identify locations which are suitable for the data embedding. For finer control of the visual quality of the watermarked image, other changes, such as changes along the diagonal and anti-diagonal directions can be considered. The consideration may also extend beyond individual 3×3 blocks, and may for example extend to constraints on the 4×4 or 5×5 block containing the 3×3 blocks. In this embodiment, only one pixel in each 3×3 block is used as a candidate pixel for data hiding. Specifically, only centre pixels of 3×3 blocks, i.e., the coarse signal pixel locations of the main processing 2×2 block. For example, pixels in the lower right corner of the even-even blocks are candidate pixels to be inverted. Other pixels could of course be used.

The candidate pixels that can be used for data hiding can be chosen from numerous locations within a 3×3 block. The 2×2 block having the candidate pixel in its bottom right location is referred to as the main 2×2 processing block for the 3×3 block. The main processing 2×2 block can be an even-even block; an odd-even block; an even-odd block and an odd-odd block, as illustrated in FIGS. 5A-5D. The corresponding locations within an image are depicted in FIGS. 6A-6D. At least one set of locations can be selected for data hiding, which contains about one quarter of the total image pixel locations.

Figure 7:
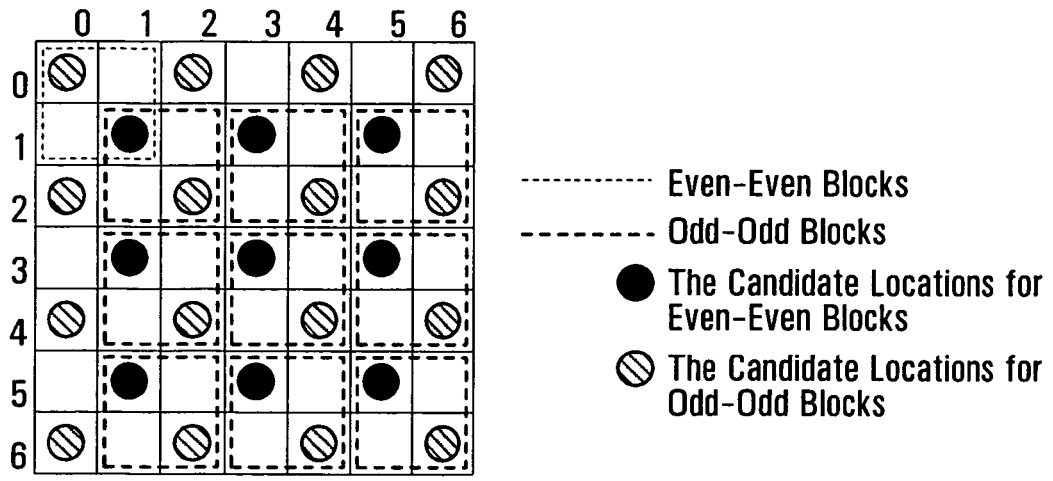
FIG. 7 shows the candidate pixel locations for the even-even and odd-odd main processing 2×2 blocks which can be combined.
Figure 8:
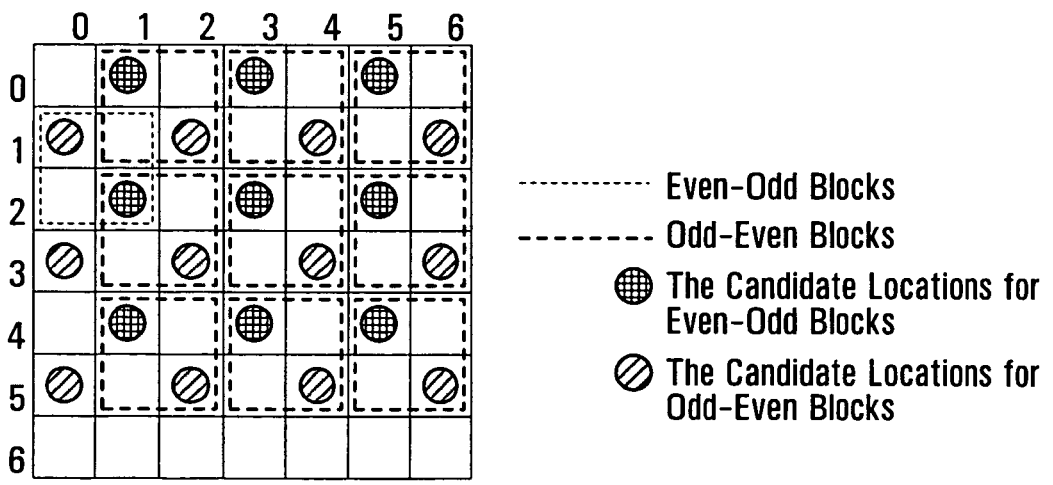
FIG. 8 shows the candidate pixel locations for the odd-even and even-odd main processing 2×2 blocks which can be combined.

Optionally, for security the selection of the set of candidate pixels, can be varied. For example, the choice of candidate pixels can be based on a random key. As detailed below, two sets of candidate pixels that are eight-connected to each other can be combined to increase the capacity. For example, FIG. 7 shows the candidate pixel locations for the even-even and odd-odd main processing 2×2 blocks which can be combined. FIG. 8 shows the candidate pixel locations for the odd-even and even-odd main processing 2×2 blocks, which can also be combined. It may be observed that by choosing the coarser signal in the lower right corner in each 2×2 main processing block, the candidate locations for an image actually cover all the image pixels except the first column and the first row. In order to utilize the first column and first row also, one column and one row data could be appended before computing the transform and these data should be discarded after the data has been embedded.

On the other hand, the coarse signal in each 2×2 block can take any one of the four pixels. The detail signals will be calculated with reference to this coarse signal. Accordingly, the coarse signal in the complementary wavelets could also take pixels in the same locations. The four options of the locations that the coarse signal can take are shown in FIG. 9. In the exemplary embodiment, the coarse signal takes the samples at the lower right corner of each block, although the remaining samples may be similarly used.

It is observed that a vertical edge exists if there is a transition between two horizontally neighboring pixels. Similarly, a horizontal edge exists if there is a transition between two vertically neighboring pixels. An illustration of the edge shifting due to flipping pixels in binary images can be found in FIGS. 4A and 4B. Flipping the center pixel of the 3×3 block of FIG. 4A will result in the 3×3 block of FIG. 4B, in which the edge locations are shifted one pixel position horizontally to the left or right and vertically one pixel location up or down.

A candidate center pixel is considered "flippable" if both the horizontal and vertical edges exist around it. For example, when the main processing 2×2 block in a 3×3 block is the even-even block, the candidate pixel in location $(m,n)=(2i+1,2j+1)$ is "embeddable" if both vertical and horizontal edges exist. The edge pixel is flipped but the shape of the edge doesn't change, so, the distortion is small by flipping the pixel in this way.

As should now be appreciated, a horizontal edge exists if either $LH_{ee}$ or $LH_{eo}$ (but not both) is equal to 1 and a vertical edge exists if either $HL_{ee}$ or $HL_{oe}$ (but not both) is equal to 1.

Mathematically, this "flippability" of a center pixel may thus be expressed as, $$f(i,j)=(HL_{ee}(i,j)\oplus HL_{oe}(i,j))\char`\^(LH_{ee}(i,j)\oplus LH_{eo}(i,j)) \quad (27)$$

where ^ is the logical AND operation. It may further be simplified to $$f(i,j)=(Y(2i,2j+1)\oplus Y(2i+2,2j+1))\char`\^(Y(2i+1,2j)\oplus Y(2i+1,2j+2)) \quad (28)$$

Put another way, f(i,j) thus identifies all of the candidate pixels for which
 (i) one pixel directly above the candidate pixel and one pixel directly below the candidate pixel have different colors; and
 (ii) one pixel immediately to the left of the candidate pixel and one pixel immediately to the right of the candidate pixel have different colors.

Additionally, two candidate pixels can not be 4-adjacent (horizontally or vertically adjacent) to each other.

3×3 blocks which satisfy these criteria (i.e. Eq. (27)) are shown in FIGS. 10A-10F. Blocks rotated by 90, 180 and 270 degrees will similarly satisfy these criteria. As can be seen from FIGS. 10A-10F, flipping the pixel in the center ensures the 4-connectivity of the center pixels with its four direct neighbors.

For convenience, pixels in 3×3 blocks about a candidate pixel p may be designated as $W_1, W_2, W_3, \ldots, W_8$ as shown in FIG. 11. In the figure, $W_1, W_3, W_5, W_7$ are the 4-neighbors of pixel p and $W_2, W_4, W_6, W_8$ are 8-neighbors of pixels p. The 4-connectivity in the 3×3 block is defined as the connectivity from the center pixel p to its 4-neighbors. This is calculated as the transitions (from "1" to "0" or vice versa) from the center pixel p to its 4-neighbors. By satisfying the above flippability conditions, the numbers of transitions for both the horizontal and vertical directions are not changed by flipping the center pixel. Therefore, the 4-connectivity is preserved. Notably, by satisfying the conditions set out above, the centre pixel has one white 4-neighbor horizontally and vertically respectively, hence it is an edge pixel from both horizontal and vertical directions even after the center pixel is flipped. Therefore, the visual quality is good. The 8-connectivity of the pixels in 3×3 neighborhood can be further ensured by imposing additional optional constraints as discussed below.

Similarly, when the main processing 2×2 block is the odd-odd block, the candidate pixel in location (m,n)=(2i,2j) is "embeddable" if both vertical and horizontal edges exist. As should now be appreciated, a vertical edge exists if either $HL_{oo}(i-1,j-1)$ or $HL_{eo}(i,j-1)$ equals to 1 and a horizontal edge exists if either $LH_{oo}(i-1,j-1)$ or $LH_{oe}(i-1,j)$ equals to 1.

Mathematically, this "flippability" or invertibility of a center pixel (2i,2j) may thus be expressed as $$f(i,j)=(HL_{oo}(i-1,j-1)\oplus HL_{eo}(i,j-1))\char`\^(LH_{oo}(i-1,j-1)\oplus LH_{oe}(i-1,j))) \quad (29)$$

where ^ is the logical AND operation. It may further be simplified as $$f(i,j)=(Y(2i-1,2j)\oplus Y(2i+1,2j))\char`\^(Y(2i,2j-1)\oplus Y(2i,2j+1)) \quad (30)$$

Figure 12:
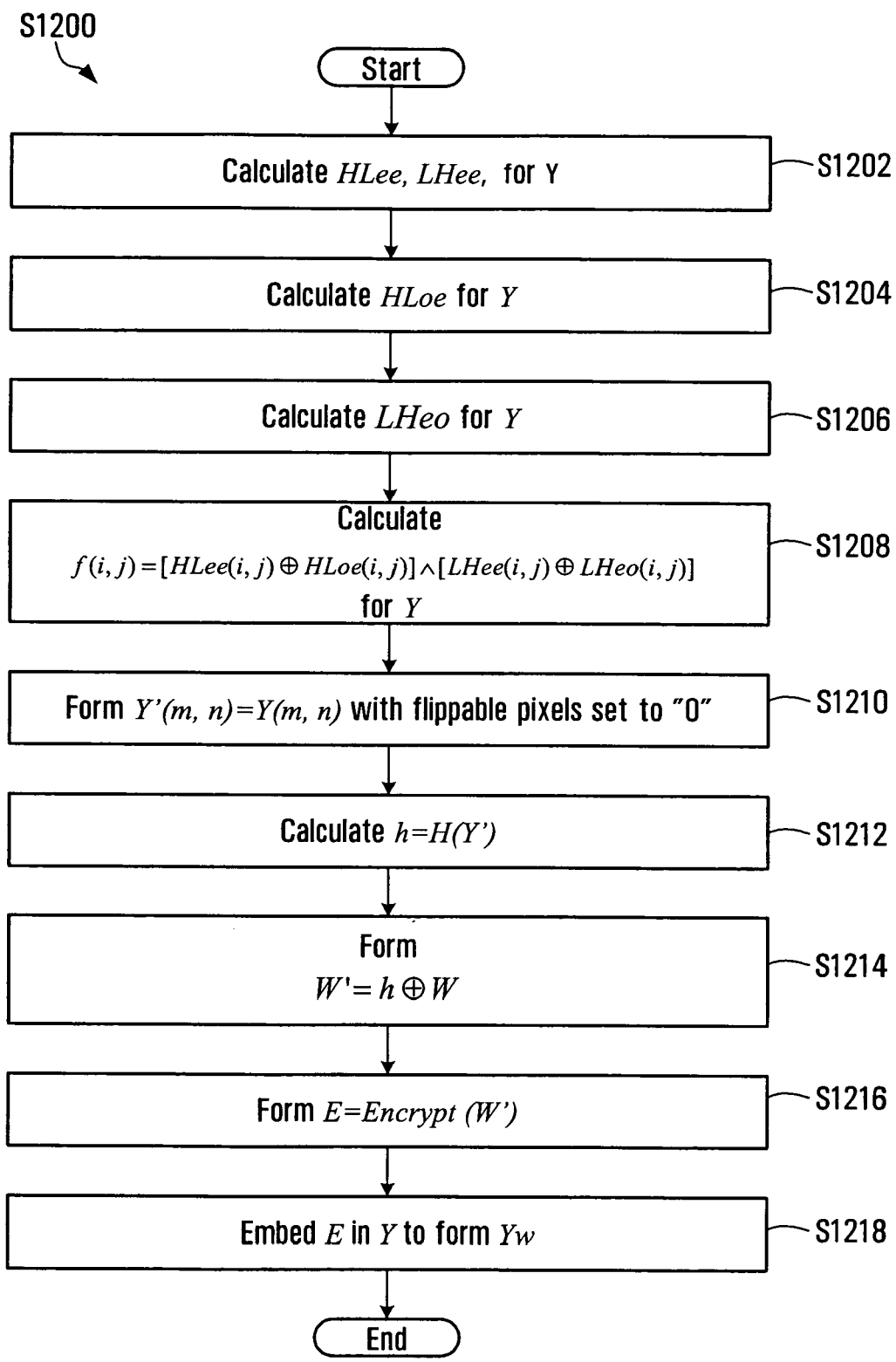
FIG. 12 is a flowchart depicting a method exemplary of an embodiment of the present invention, used to locate embeddable candidate pixels and to embed watermark data.

Accordingly, software at device 10 may perform steps S1200, depicted in FIG. 12 in order to locate 3×3 blocks containing a "flippable" pixel within an image Y, and embed data. For example, candidate pixels are chosen at locations having co-ordinates (m,n)=(2i+1, 2j+1) in the image Y. That is, the main processing 2×2 block of each 3×3 block is an even-even blocks.

In the exemplary embodiment, exemplary software calculates the even-even block wavelet transform of the input image Y, in step S1202. This is done by sub-sampling pixels in blocks starting at even row and even column co-ordinates within the original image, and further calculating the difference between the sub-sampled pixels (pixels located at odd row and odd columns) and adjacent vertical, horizontal and diagonal pixels. This may be done in accordance with Eq. (5)-(8), or otherwise. The transform coefficients $HL_{ee}(i,j)$ and $LH_{ee}(i,j)$ can thus be obtained.

In step S1204 and S1206 even-odd block transform and the odd-even block transform coefficients of the input image Y are calculated. The coefficients $HL_{oe}(i,j)$ and $LH_{eo}(i,j)$ can thus be obtained. Even-odd block transform coefficients are calculated by sub-sampling 2×2 pixel blocks starting at even column, and odd row co-ordinates within the original image, and calculating the difference between sub-sampled pixels (pixels at odd column and even row coordinates) and horizontal, vertical and diagonal neighbours. Odd-even block transform coefficients are calculated by sub-sampling pixels 2×2 pixel blocks starting at even row, and odd column co-ordinates within the original image, and calculating the difference between the sub-sampled pixels (pixels at even column and odd row coordinates) and horizontal, vertical and diagonal neighbours. This may be done in accordance with equations (15)-(18) and (19)-(22).

Now, the "flippability" of each candidate pixel in the original image Y may be determined by locating HL and LH coefficients from the even-even transform, the even-odd block transform and the odd-even block transform satisfying the condition set out in equation (27) in block S1208.

If f(i,j) equals to "1", a corresponding pixel in the lower right corner of the even-even block, i.e., pixels in location (2i+1,2j+1) in the original image is identified as the "flippable".

Once the "flippable" pixels are located, an intermediate image Y' may be generated by setting the pixels in the "flippable" locations of the original image to fixed values, e.g., 0s, in step S1210. Then, the hash value h of the intermediate image Y' may be obtained in step S1212 by applying a conventional hash function, e.g., SHA-1, MD5, to obtain the hash value h=H(Y').

The hash value h may next be combined with the payload watermark W and XORed with it to generate W', W'=H(Y')⊕W. This can be done by repeating bits of the hash value several times to generate the same length sequence as the payload watermark.

Optionally, the payload watermark W can be encrypted before performing the XOR with the hash value h. For additional security, W' may be encrypted with a public encryption algorithm to generate an encrypted watermark, E in step S1216. For example, a key $K_s$ from the authorized user or owner may be used to encrypt W' to generate the E=Encrypt (W',$K_s$), where Encrypt is a conventional encryption function, such as the encryption portion of a public/private key encryption algorithm, like the RSA algorithm.

Once a location in image is identified as "flippable", bits of the watermark (E) may be embedded by flipping the "flippable" pixels within the image Y to correspond to E. Alternatively, "flippable" bits may be flipped to enforce even or odd parity of the number of black or white pixels in the corresponding 2×2 blocks or 3×3 blocks which contains the "flippable" pixel.

It should be apparent from the above description that there is no need to generate the entire set of coefficients of the even-even block wavelet transform, the odd-even block wavelet transform, and the even-odd block wavelet transform of the input image. That is, in the above embodiment, only $HL_{ee}$, $LH_{ee}$, $HL_{oe}$ and $LH_{eo}$ are used. Therefore, the computation load is low. Depending on the requirements of the visual quality of the watermarked image, other constraints may be imposed so that more coefficients need to be obtained.

It can now be observed that the "flippability" condition is independent of the value of the center pixel of each block. With reference to Eq. (27), the "flippability" of the candidate pixel Y(2i+1,2j+1) in the even-even blocks actually depends on the condition whether there is an edge in both horizontal and vertical directions, i.e., in the horizontal direction, either $HL_{ee}(i,j)$ or $HL_{oe}(i,j)$ equals to "1" and in the vertically direction, either $LH_{ee}(i,j)$ or $LH_{eo}(i,j)$ equals to "1". As shown in FIGS. 4A and 4B, after flipping the pixel Y(2i+1, 2j+1), the transition will be shifted one position horizontally, e.g., $HL_{ee}$ (i,j) becomes its complement and so does $HL_{oe}(i,j)$. In this way, it still satisfies that either $HL_{ee}(i,j)$ or $HL_{oe}(i,j)$ equals to "1". So, the vertical edge still exists. Similarly, the horizontal edge still exists after flipping the pixel. Hence, the same set of operations to find the "embeddable" locations can be employed for the watermark extraction and verification process.

Figure 13:
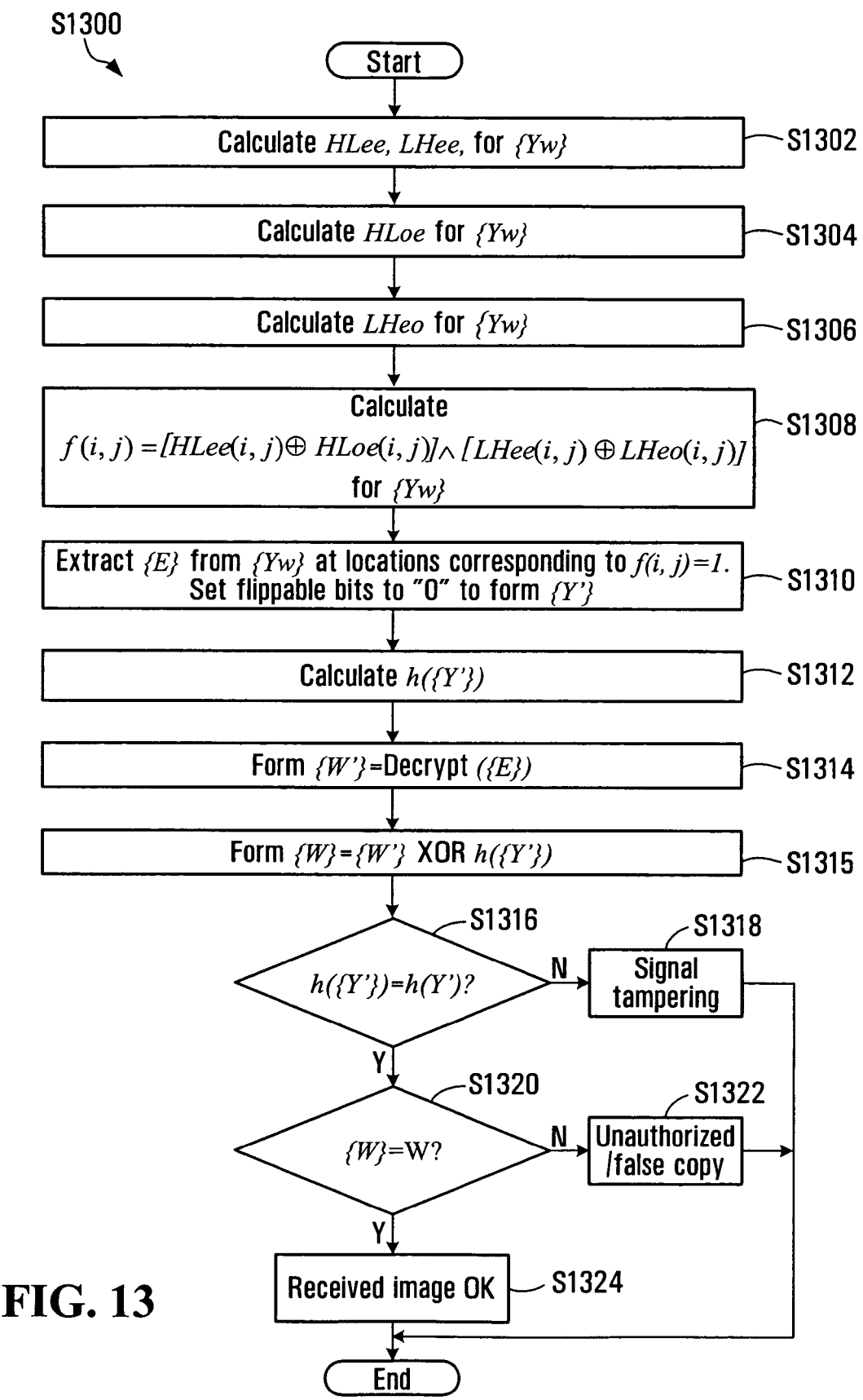
FIG. 13 is a flowchart depicting a method exemplary of an embodiment of the present invention, used to extract watermark data embedded in accordance with the method of FIG. 12.

Example watermark extraction and authentication are therefore illustrated in FIG. 13.

Steps S1302-S1308 identical to steps S1202-S1208 as in the watermark embedding process, are performed on a received image {$Y_w$} including a watermark. These steps identify the "flippable" candidate pixels in the received watermarked image {$Y_w$}.

Next, flippable pixels may be set to the known value (e.g. "0") in step S1310, to reconstruct {Y'}. At the same time, watermark data {E} may be extracted from the "embeddable" locations of the watermarked image based on the center pixel of the 3×3 block or the parity of the number of black or white pixels in the corresponding 2×2 or 3×3 block in the watermarked image in step S1310. The hash value {H}=h({Y'}) of the image {Y'} may be calculated in block S1312.

If encrypted, {E} may be decrypted in step S1314, by employing an algorithm to obtain {W'}=Decrypt ({E}, $K_p$), where $K_p$ is the corresponding public key from the authorized user or owner, and Decrypt is the inverse of the encryption function used in step S1216.

The hash value of the watermarked received image {h} may be repeated to the same length of the extracted {W'}. The watermark bits {W'} may next be XORed with the tiled hash value of the watermarked image to extract {W}.

Once extracted, {W} may be compared with the original watermark W for Y to determine the authenticity and integrity of the watermarked image. If the hash value of the watermarked image h({Y'}) is different from the retrieved hash value of the original image h(Y'), tampering or an incorrect decoding key may be suspected. This will render the retrieved watermark {W} different from the original watermark W. Similarly, if an incorrect watermark is used for verification, the comparison will also fail, suggesting that the holder of the watermark is not the authorized user or owner.

Since the hash function is computed on the whole image, the tampered regions can not be located using this technique. Due to the sensitivity of the hash function to changes, even a single bit change will change the extracted watermark data significantly. So, the proposed hard authenticator watermark is effective largely in detecting any tampers made to the watermarked binary image.

Note that the above embodiments may be varied in numerous ways. For example, instead of employing an asymmetric encryption algorithm, e.g., RSA to generate the digital signature, a symmetric encryption algorithm could be used, e.g., Triple-DES. In this case, the secret key used for both the encryption and decryption would be exchanged in a conventional manner.

To increase the security of the method, a unique image ID could be assigned to each image, which is to be authenticated. This secret information could be combined with the image and then fed to the hash function to obtain the content signature. Only those authorized user or owner who knows this information can compute the correct hash value of a particular image, which prevents the adversary from forgery.

Similarly, steps could be re-ordered. For example, instead of performing the XOR of the hash value of the original image with the payload watermark, and then encrypting it, the content signature of the image could be generated first. The content signature can be tiled to the same length as the payload watermark, and then XORed with the payload watermark to generate the final watermark.

Alternatively, the payload watermark may be embedded first, but some locations may be reserved to embed a digital signature. Clearly, those reserved locations may be cleared (i.e. set to "0" or "1"). The watermarked image with the reserved locations cleared will be used generate the intermediate image and fed to a hash function to obtain the hash value. The hash value may be encrypted with a private key to generate the content signature. This signature may be embedded in those "reserved" locations. In the comparison process, the content signature is extracted, decrypted to obtain the hash value of the original watermarked image. The hash value of the watermarked image can be generated by clearing the reserved locations and applying a hash function. While the payload watermark can be extracted from those "non-reserved" "flippable" locations. Comparisons of the two hash values give the integrity and authority of the watermarked image.

Once the whole set of "flippable" locations which can be used for the data hiding is obtained, the location or order used to hide each particular watermark bit may be varied in dependence on a random key. Of course, the same random key or the secret seed value is needed for the watermark extraction. For example, if a signature has only x bits, only x locations need to be randomly chosen from the whole "flippable" sets to embed this signature. In this case, the hash value may be generated by only setting those "embeddable" locations of the image to "0s", and then applying the hash function. Similarly, the extraction process would be complementary.

The payload watermark is not constrained to a particular type. It can be used to authenticate a document, but it may be a random sequence, a text string, password, logo images, or even bio-data, e.g., fingerprint, handwritten signatures of the authorized user or owner.

For additional visual quality of the proposed scheme can be further controlled by imposing more rigid constraints on the relationship of the coefficients in steps S1208 and S1308. For example, for Chinese and Japanese documents, it is more obtrusive to flip pixels in sharp corners. 3×3 blocks containing such sharp corners and satisfying Eq. (27) are depicted in FIGS. 14A-14H.

In this case, the coefficients of different wavelet transforms can be employed to control not to flip pixels in 3×3 blocks having sharp corners, which is the "sharp corner flipping" problem. The total number of black pixels in the corresponding 3×3 blocks is $N_b$. The extra constraint $S_s$ is imposed to control not to flip pixels in the sharp corners and given by $$Ss_1(i,j)=(LL_{ee}(i,j)=0)\char`\^(N_b=5) \quad (31)$$

$$Ss_2(i,j)=(LL_{ee}(i,j)=1)\char`\^(N_b=6) \quad (32)$$

where "1" represents the black pixel, "0" represents the white pixel and "^" represents the logical "and" operation.

For blocks satisfying Eq. (27), additional constraints for the "sharp corner" patterns may be imposed in block S1208 and S1308 by further (a) Checking the center pixel in each 3×3 block, i.e., $LL_{ee}$ (i,j) to determine whether it is a black pixel or white pixel.

(b) Calculating the total number of black pixels in each 3×3 block. The total number of black pixels in each 3×3 block for the "sharp corner" pattern will be 5 or 6 for a white and black center pixel, respectively.

Figure 14A:
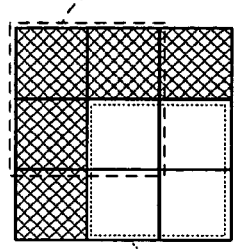
FIGS. 14A-14H are examples of 3×3 blocks including a candidate center pixel which may be excluded for embedding watermark data in an image.
Figure 14B:
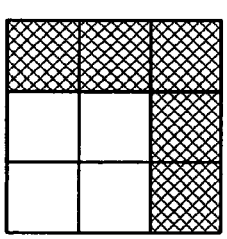
Figure 14C:
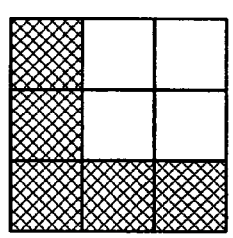
Figure 14D:
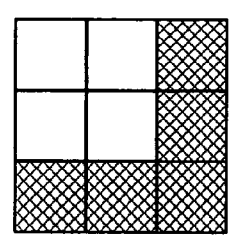
Figure 14E:
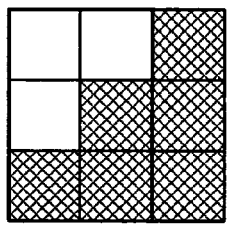
Figure 14F:
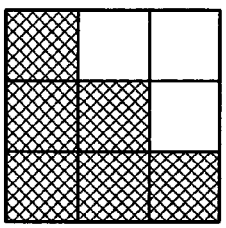
Figure 14G:
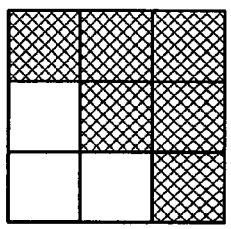
Figure 14H:
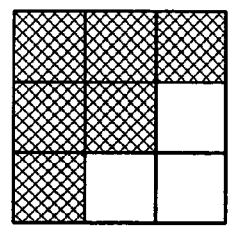

(c) Determining the dominant edge block within the 3×3 block. The transitions from the center pixel to its four neighbors, i.e., HL and LH coefficients for different wavelet transforms are checked. If both HL and LH equal to "1", the 2×2 block within the 3×3 block is identified as the dominant edge block. For example, the top left 2×2 block of the 3×3 block of FIG. 14A is a dominant 2×2 block.

(d) The 2×2 block which lies to the diagonal direction of the dominant edge block is considered to be the "pair block".

(e) Checking the "pair block" to make sure that there is no black pixel in the block except in the center location of the 3×3 block. Noted that by satisfying the "flippability condition", only the corner pixel in the "pair block" is not determined. In this way, it can be ensured that the processed pattern is a sharp corner pattern. This can be done by checking the corresponding HH coefficients of the "pair block".

Mathematically, if the condition defined in Eq. (31) $Ss_1(i,j)$ is true, a first "sharp corner" condition expressed above is given by

```
if (HL_ee(i,j) = 1) ∧ (LH_ee(i,j) = 1) ∧ (HH_oo(i,j) = 0)          (33)
    S_s(i,j) = 1;
elseif (HL_oe(i,j) = 1) ∧ (LH_ee(i,j) = 1) ∧ (HH_eo(i,j) = 0)
    S_s(i,j) = 1;
elseif (HL_ee(i,j) = 1) ∧ (LH_eo(i,j) = 1) ∧ (HH_oe(i,j) = 0)
    S_s(i,j) = 1;
elseif (HL_oe(i,j) = 1) ∧ (LH_eo(i,j) = 1) ∧ (HH_ee(i,j) = 0)
    S_s(i,j) = 1;
endif
```

Example 3×3 blocks satisfying equation (33) are depicted in FIGS. 14A-14D.

Similarly, if the condition defined in Eq. (32) $SS_2(i,j)$ is true, a second "sharp corner" condition is given by

```
if (HL_ee(i,j) = 1) ∧ (LH_ee(i,j) = 1) ∧ (HH_ee(i,j) = 1)          (34)
    S_s(i,j) = 1;
elseif (HL_oe(i,j) = 1) ∧ (LH_ee(i,j) = 1) ∧ (HH_oe(i,j) = 1)
    S_s(i,j) = 1;
elseif (HL_ee(i,j) = 1) ∧ (LH_eo(i,j) = 1) ∧ (HH_eo(i,j) = 1)
    S_s(i,j) = 1;
elseif (HL_oe(i,j) = 1) ∧ (LH_eo(i,j) = 1) ∧ (HH_oo(i,j) = 1)
    S_s(i,j) = 1;
endif
```

Example 3×3 blocks satisfying equation (34) are depicted in FIGS. 14E-14H.

If $S_s(i,j)$ equals to "1", it is identified as a "sharp corner" pattern, the candidate pixel cannot be flipped. Hence, the method of FIG. 12 is allowing the imposition of further constraints to control the quality of the watermarked document image. Note that the checks defined in Eq. (33) and Eq. (34) need to be performed in block S1208, only on those 3×3 blocks that satisfy the "flippability condition" and where the total number of black pixels in the 3×3 block is 5 or 6. Hence, the increase of the computation load is trivial. Decoding steps S1300 could be similarly modified.

In an alternate embodiment, a different binary wavelet transform may be used to locate "flippable" pixels within an image. Specifically, the binary wavelet transform that is typically referred to as the "lifting scheme" may be used. The lifting scheme is detailed in W. Sweldens, "The lifting scheme: A construction of second generation wavelets," SIAM J. Math. Anal., Vol. 29, pp. 511-546, 1998; and W. Sweldens, "The lifting scheme: A new philosophy in biorthogonal wavelet constructions," Proc. SPIE Wavelet Applications Signal Image Processing III, Vol. 2569, A. F. Lain and M. Unser, Eds, 1995, pp. 68-79.

In the lifting scheme, for a one-dimensional signal, the coarse signal may take the even indexed samples and be updated by the difference of its two neighboring odd indexed samples. The detail signal would be the difference of every two odd samples, which surround the even indexed sample. Alternatively, for a one-dimensional signal, the coarse signal may take the odd indexed samples and be updated by the difference of its two neighboring even indexed samples. The detail signal is then the difference of every two even indexed samples, which surround the odd indexed sample.

For a one dimensional signal, an even lifting based transform may thus be performed as follows:

1) The original signal Y is split into two disjoint sets, e.g., odd indexed sets and even indexed sets, denote as $x_e(n) = Y(2n)$ and $x_o(n) = Y(2n+1)$.
2) The odd sets are predicted from the even sets and used the previous prediction error, i.e. $(e(n-1)=Y(2n-1)\oplus Y(2n))$ to update the current prediction.

$$d(n) = Y(2n) \oplus Y(2n+1) \oplus e(n-1) \quad (35)$$
$$= Y(2n) \oplus Y(2n+1) \oplus (Y(2n-1) \oplus Y(2n))$$
$$= Y(2n-1) \oplus Y(2n+1)$$

3) The coarse approximation of the original signal is the even sets of samples, $x_e(n)$ which is updated by the prediction error d(n). That is $$s(n) = x_e(n) \oplus U(d(n)) \quad (36)$$
$$= x_e(n) \oplus d(n)$$
$$= Y(2n) \oplus d(n)$$

The boundary condition is defined as $d(0)=Y(1)$ and $s(0)=Y(0)\oplus d(0)=Y(0)\oplus Y(1)$.

The original signal can then be reconstructed losslessly as, $$Y(2n)=s(n)\oplus U(d(n))=s(n)\oplus d(n) Y(2n+1)=d(n)\oplus P(x_e(n))=Y(2n-1)\oplus d(n) \quad (37)$$

the boundary condition is defined as $Y(1)=d(0)$ and $Y(0)=s(0)\oplus d(0)$.

The forward transform is given by $$d(l)=Y(2l+1)\oplus Y(2l-1) \quad (38)$$

$$s(l)=Y(2l)\oplus d(l) \quad (39)$$

The boundary condition is given by $$\begin{cases} d(0) = Y(1) \\ s(0) = Y(0) \oplus Y(1) \end{cases} \quad (40)$$

The transform is thus designed to catch the varying characteristics of the signal, in both the directions. It actually keeps track of transitions among every three neighboring pixels, e.g, $Y(2i-1)$, $Y(2i)$ and $Y(2i+1)$. The changes in the transitions are used to adaptively update the coarse representation so that the scaled signal s represents the minority (edges) of every three samples. In this way, the coarse signal identifies transitions among three pixels and can be used for many binary image processing, e.g., denoising. If the coarse signal s is used for data hiding, e.g., embed the watermark data in the LL coefficients, the update step may not be necessary, in this case, s may just takes the even samples, i.e., Eq. (39) becomes $s(l)=Y(2l)$.

For the even indexed coefficients $Y(2l)$, the transform analyses the two (which can be extended) nearest coefficients $Y(2l-k)$ (n point data window), $k=1, 3, 5, \ldots, n \in Z$. The prediction is chosen as the difference of the data set. The inverse transform for 1-D signal is given by $$Y(2l+1)=Y(2l-1)\oplus d(l) \quad (41)$$

$$Y(2l)=s(l)\oplus d(l) \quad (42)$$

The boundary condition is given by $$\begin{cases} Y(0) = s(0) \oplus d(0) & \text{when } l = 0 \\ Y(1) = d(0) \end{cases} \quad (43)$$

For a 2-D signal, the prediction and update lifting transform is based on a 3×3 window, which surrounds the sample.

$$\begin{cases} \text{For } i = 0; j > 0 \\ v(0, j) = Y(1, 2j) \\ d(0, j) = Y(1, 2j-1) \oplus Y(1, 2j+1) \\ h(0, j) = Y(0, 2j-1) \oplus Y(0, 2j+1) \\ s(0, j) = Y(0, 2j) \oplus [Y(1, 2j) \oplus Y(0, 2j-1) \oplus Y(0, 2j+1)] \\ \\ \text{For } i = 0; i > 0 \\ h(i, 0) = Y(2i, 1) \\ d(i, 0) = Y(2i-1, 1) \oplus Y(2i+1, 1) \\ v(i, 0) = Y(2i-1, 0) \oplus Y(2i+1, 0) \\ s(i, 0) = Y(2i, 0) \oplus [Y(2i-1, 0) \oplus Y(2i+1, 0) \oplus Y(2i, 1)] \\ \\ \text{for } i = 0; j = 0 \\ h(0, 0) = Y(0, 1) \\ v(0, 0) = Y(1, 0) \\ d(0, 0) = Y(1, 1) \\ s(0, 0) = Y(0, 0) \oplus [Y(1, 0) \oplus Y(0, 1)] \end{cases} \quad (48)$$

For an even-even 2-D lifting transform, the coarse signal may take every even sample from both row and column directions and be updated by the difference of its horizontal and vertical detail signals. The horizontal detail signal is the difference of the two odd samples, which surround the coarse signal in the vertical direction. The vertical detail signal is the difference of the two odd samples, which surround the coarse signal along the horizontal direction. The diagonal detail signal includes a component representative of the difference of the four samples, which are 8-connected to the coarse signal from its diagonal and anti-diagonal directions.

The coarse and fine components of the original 2-D signal Y are given by $$s(i,j) = Y(2i, 2j) \oplus u(i,j)$$

where $$u(i,j) = v(i,j) \oplus h(i,j)$$

so that $$s(i,j) = Y(2i, 2j) \oplus [Y(2i-1, 2j) \oplus Y(2i+1, 2j) \oplus Y(2i, 2j-1) \oplus Y(2i, 2j+1)] \quad (44)$$

$$v(i,j) = Y(2i-1, 2j) \oplus Y(2i+1, 2j) \quad (45)$$

$$h(i,j) = Y(2i, 2j-1) \oplus Y(2i, 2j+1) \quad (46)$$

$$d(i,j) = Y(2i-1, 2j-1) \oplus Y(2i+1, 2j-1) \oplus Y(2i-1, 2j+1) \oplus Y(2i+1, 2j+1) \quad (47)$$

where i=0, 1, 2, ..., M−1 and j=0, 1, 2, ..., N−1 are the index of the 2-D coarse signal of size M×N and u(i,j)=v(i,j)⊕h(i,j).

The boundary conditions are t,0330

The original signal Y may be calculated from the prediction and update signals $$\left.\begin{array}{l} m \text{ even} \\ n \text{ even} \end{array}\right\} Y(m, n) = s\left(\frac{m}{2}, \frac{n}{2}\right) \oplus \left[v\left(\frac{m}{2}, \frac{n}{2}\right) \oplus h\left(\frac{m}{2}, \frac{n}{2}\right)\right] \quad (49)$$

$$\left.\begin{array}{l} m \text{ even} \\ n \text{ odd} \end{array}\right\} Y(m, n) = h\left(\frac{m}{2}, \frac{n-1}{2}\right) \oplus Y(m, n-2) \quad (50)$$

$$\left.\begin{array}{l} m \text{ odd} \\ n \text{ even} \end{array}\right\} Y(m, n) = v\left(\frac{m-1}{2}, \frac{n}{2}\right) \oplus Y(m-2, n) \quad (51)$$

$$\left.\begin{array}{l} m \text{ odd} \\ n \text{ odd} \end{array}\right\} Y(m, n) = \quad (52)$$
$$d\left(\frac{m-1}{2}, \frac{n-1}{2}\right) \oplus Y(m-2, n-2) \oplus Y(m-2, n) \oplus Y(m, n-2)$$

The boundary conditions are given by $$\begin{cases} m = 1, n > 1 \\ Y(1, n) = v\left(0, \frac{n}{2}\right) \text{ when } n \text{ is even} \\ Y(1, n) = d\left(0, \frac{n-1}{2}\right) \oplus Y(1, n-2) \text{ when } n \text{ is odd} \\ \\ n = 1, m > 1 \\ Y(m, 1) = h\left(\frac{m}{2}, 0\right) \text{ when } m \text{ is even} \\ Y(m, 1) = d\left(\frac{m-1}{2}, 0\right) \oplus Y(m-2, 1) \text{ when } m \text{ is odd} \\ \\ m \le 1, n \le 1 \\ Y(1, 0) = v(0, 0) \\ Y(0, 1) = h(0, 0) \\ Y(1, 1) = d(0, 0) \\ Y(0, 0) = s(0, 0) \oplus [h(0, 0) \oplus v(0, 0)] \end{cases} \quad (53)$$

In a similar way, odd 2-D signal transforms may be defined about pixels having odd row and/or odd column addresses.

That is, three types of odd lifting transforms may be defined: the first one is the even-odd lifting transform that forms the coarse signal from odd row and even column direction co-ordinates. In this case, one row data may be inserted before the first row before applying the transform and these data should be discarded after processing. In the second transform, the odd-even lifting transform, the coarse signal is formed from samples along even row co-ordinates and odd column co-ordinates. In this case, one column data may be inserted before the first column before applying the transform and these data should be discarded after processing. In the third transform, the odd-odd lifting transform, the coarse signal is formed from samples at odd row and odd column locations. In this case, one row and one column data should be inserted before the first row and first column of the image before applying the transform and these data should be discarded after processing. Correspondingly, the detail signals for each processing cases can be defined with reference to the horizontal, vertical and diagonal adjacent pixels of the coarse signal.

Now, the "flippability condition" of the center pixel of any 3×3 block is based on the relations of the LH and HL coefficients of the lifting transform for that block. For example, for the odd-odd lifting transform, the flippability condition of pixel (2i+1, 2j+1) in the image Y is met if $$HL_{LOO}(i,j) \hat{} LH_{Loo}(i,j) = 1 \quad (54)$$

The subscript L is used to represent the "lifting scheme" in order to differentiate from the coefficients obtained for the interlaced transform.

That is the flippability f(i,j) of pixel Y(2i+1, 2j+1) may be calculated as $$f(i,j)=(Y(2i+1,2j)\oplus Y(2i+1,2j+2))^\frown(Y(2i,2j+1)\oplus Y(2i+2,2j+1)) \quad (55)$$

Again, if f(i,j)=1 the current coefficient is identified as "flippable". Otherwise, it is not "flippable".

Conveniently, unlike in method of FIGS. 12 and 13, the watermark may be embedded in either the original image Y, or in the LL(i,j) coefficients of the odd-odd lifting transform.

If the watermark is embedded in the LL(i,j) coefficients, the watermark will be embedded in the image Y once the inverse transform is computed.

Notably equations (44)-(47) is defined for the even-even lifting transform, similarly, the "flippability condition" of pixel Y(2i, 2j) in the image Y is met if $$HL_{Lee}(i,j)\frown LH_{Lee}(i,j)=1 \quad (56)$$

That is the flippability f(i,j) of pixel Y(2i, 2j) may be calculated as $$f(i,j)=(Y(2i,2j-1)\oplus Y(2i,2j+1))^\frown(Y(2i-1,2j)\oplus Y(2i+1,2j)). \quad (57)$$

Accordingly, methods S1200 of FIG. 12 may be modified by replacing blocks S1202-S1208, with a block that calculates f(i,j) in accordance with equations (54) or (55). Optionally, step the entire lifting transform may be performed to arrive at LL, HL, LH and HH. If so, step S1218 may also be modified to embed the watermark in the LL portion of the transformed image. An inverse lifting transform should be computed to obtain the watermarked image.

Figure 15:
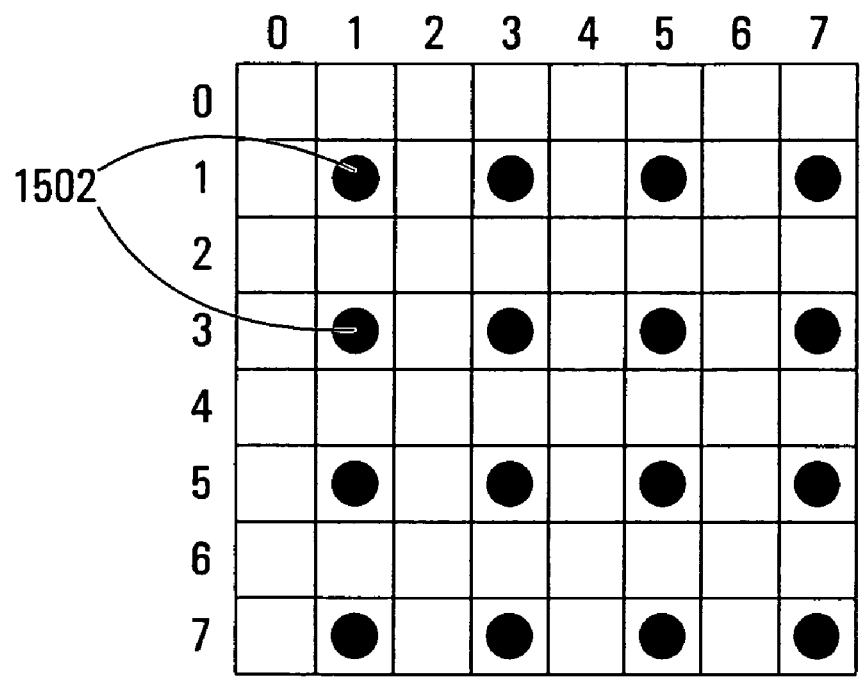
FIG. 15 illustrates a further distribution of candidate pixels which may be suitable for embedding watermark data in an image.

The capacity of the above methods can be calculated based on the "flippability condition", or in other words, the visual distortion caused by flipping the pixel. The number of pixels in the candidate locations which satisfy the "flippability condition" defined in Eq. (54) or Eq. (55) is $N_c$ will be the capacity of the image. However, it should be noticed that the maximum number of candidate pixels is $$\left\lfloor \frac{1}{4} \times M \times N \right\rfloor$$

for an image with size M×N (since every 2×2 block has one candidate pixel—as depicted in FIG. 15), which is the upper bound of the capacity, i.e., $$N_c \leq \left\lfloor \frac{1}{4} \times M \times N \right\rfloor,$$

where $\lfloor x \rfloor$ is the floor function which gives the largest integer less than or equal to x.

Figure 16:
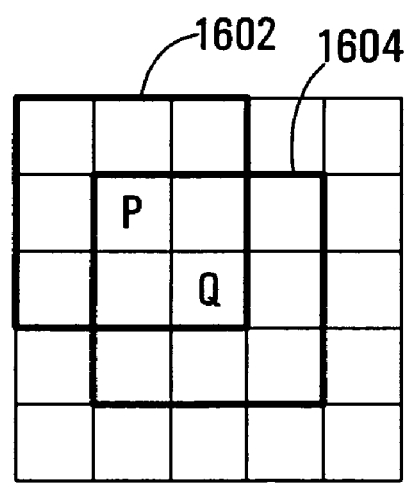
FIG. 16 illustrates two candidate pixels in an image within two overlapping 3×3 blocks.
Figure 17:
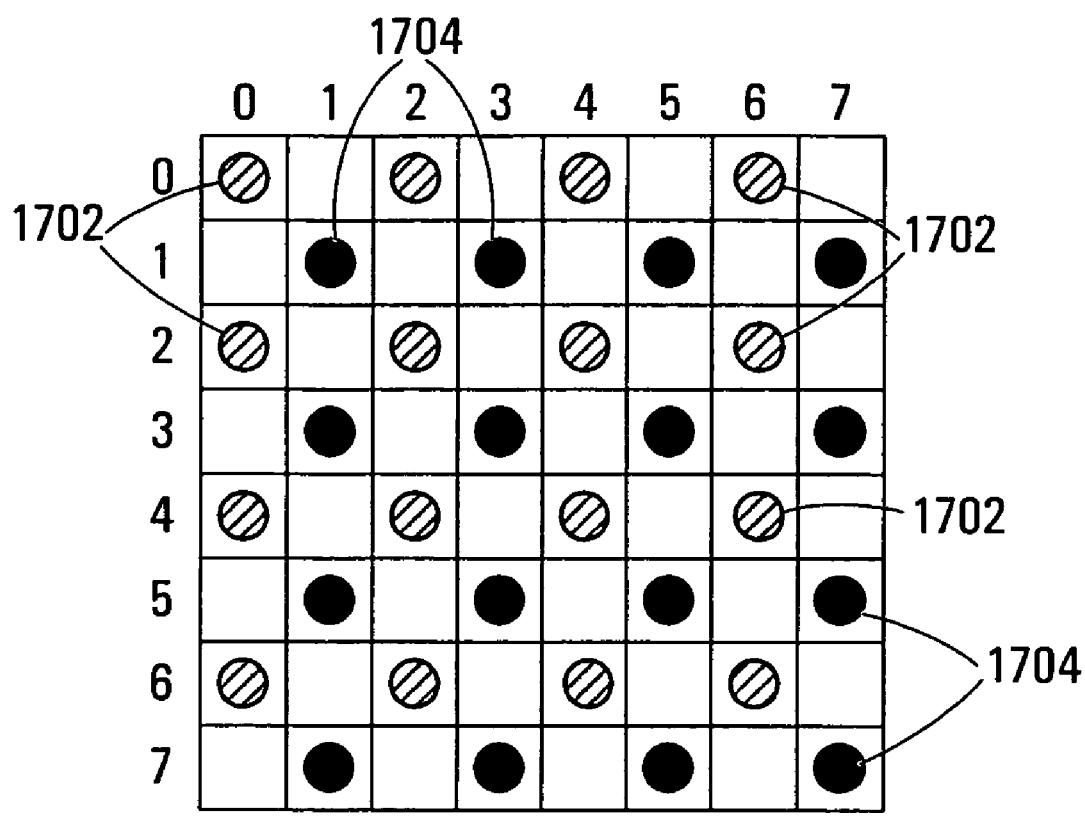
FIG. 17 illustrates the candidate locations for the odd, odd lifting transform and the even, even lifting transform which can be combined.

As flipping pixels in accordance satisfying Eq. (54) or Eq. (55) (which is equivalent to Eq. (27) or Eq. (28) for the interlaced wavelet transform) does not affect pixels identified as flippable by Eq. (56) or Eq. (57) (which is equivalent to Eq. (29) or Eq. (30) for the interlaced wavelet transform), the two flippability conditions of Eq. (55) and (57) may be ORed. This is best illustrated for candidate pixels P and Q depicted in FIG. 16. As shown in FIG. 16, the candidate locations for data hiding are the lower right corner of the main processing block, e.g., pixel P for the main processing 2×2 block starts from even coordinates from both row and column directions (this is equivalent to the odd-odd lifting transform) and pixel Q for the main processing 2×2 block starts from odd coordinates from both row and column directions (this is equivalent to the even-even lifting scheme). The "flippability" decision is made based on the changes in the HL and LH coefficients for different wavelet transforms (or just based on the HL and LH coefficients for the lifting transforms). In other words, only horizontal and vertical neighbors will affect the "flippability" of the coefficients. So, these two processing units are immune to each other. Flipping pixels in one processing case doesn't affect the "flippability condition" in the other. Similarly, the other two processing cases, in which the processing block starts from odd-even and even-odd coordinates respectively (which is equivalent to the even-odd and odd-even lifting transform) can also be combined to increase the capacity. In other words, by using the flippability condition of Eq. (55) and Eq. (57), every second pixel in each row may be used as a candidate pixel, provided no two candidate pixels are vertically or horizontally adjacent. Possible candidate pixels 1702, 1704 in an image are illustrated in FIG. 17.

Again, optionally, the sequence of processing the two sets of candidate pixels can depend on a random key that may be generated by using a secret seed value from the authorized user or owner. For example, if the output from the pseudo random generator is odd, check the flippability of the candidate pixel from the odd-odd block first, otherwise check the even-even block first. Once the flippability condition is true, it will proceed to the next 2×2 block thereby excluding identifying more than one pixel in each 2×2 block of the image as invertible. In this case, the uncertainties are increased by switching the processing cases randomly. Therefore, it is difficult for an adversary to figure out the data hiding locations.

Generally speaking, the capacity of an image can be roughly doubled by combining the two sets of candidate conditions, e.g., the maximum number of candidate pixels is $$\left\lfloor \frac{1}{2} \times M \times N \right\rfloor$$

for an image with size M×N. However, in each designated 2×2 block shown in FIG. 7 and FIG. 8, only one pixel will be flipped to hide the information.

It should be noted that the two processing cases cannot be utilized together if we need to further control the visual quality by checking the HH coefficients. This is due to the fact that flipping one candidate pixel in one processing case will change the HH coefficients in another processing case.

The proposed data hiding method can be applied to various kinds of binary images of different resolutions, e.g., text documents in different languages and different resolutions, English, French, Chinese, Thai, and Handwritten etc. It can also be applied to the various cartoons, line drawings, block diagrams, tables, equations and halftone images.

The above embodiments may be varied in numerous ways. For example, depending on different visual distortion requirements of the watermarked image, additional conditions for determining the "flippable" pixels may be set differently and the consideration block may be extended to a block which is larger than 3×3. As shown in FIG. 18, in some applications, the "end stroke" pattern may be employed for data hiding The steps of determining the "flippability" for the center pixel of the "end stroke" patterns can be: Firstly, determine the flippability of the pixels in 3×3 block. Secondly, determine the main edge direction in the 3×3 block. Thirdly, check in 4×4 block by following the main edge direction in 3×3 block to make sure that it is an "end stroke" pattern.

Figure 18A:
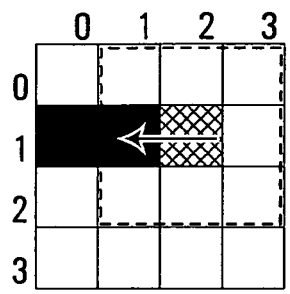
FIG. 18 lists of the "end stroke" patterns.
Figure 18B:
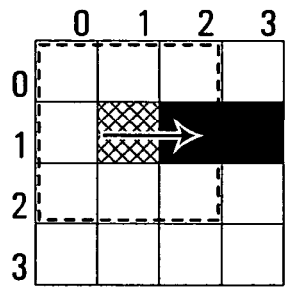
Figure 18C:
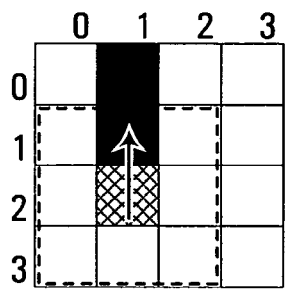
Figure 18D:
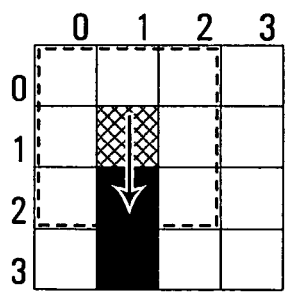
Figure 18E:
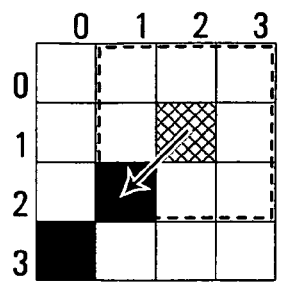
Figure 18F:
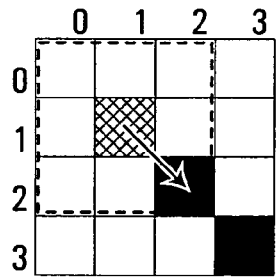
Figure 18G:
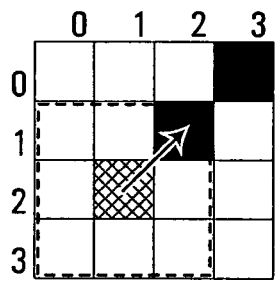
Figure 18H:
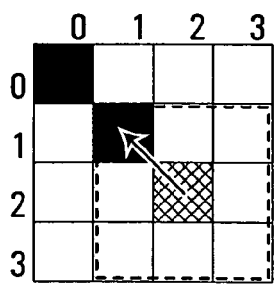

The conditions for determining the "flippability" for the pixel shown in FIG. 18A for the center pixel to be white is given by

```
if(HL_ee(i,j)⊕HL_oe(i,j)) ∧ (~(LH_ee(i,j)⊕LH_eo(i,j)))∧        (58)
  (~LH_ee(i,j)) ∧ (~LL_ee(i,j)) ∧ (~HH_oe(i,j)) ∧ (~HH_oo(i,j))
  if HL_ee(i,j) (edgedirectionto the left)
    flag(i,j) = 1; (indicate edge direction)
    if (~HL_oe(i-1,j)) ∧ LH_ee(i-1,j) ∧ LH_eo(i-1,j)∧
    LH_oo(i-1,j) ∧ LH_oe(i-1,j)
    (check4x4block)
      flip(i,j) = 1; (indicate"flippable)'
    end
  end
end
```

Where, "~" represents logic "not". Similarly, the flip conditions for other cases can be defined.

Figure 19:
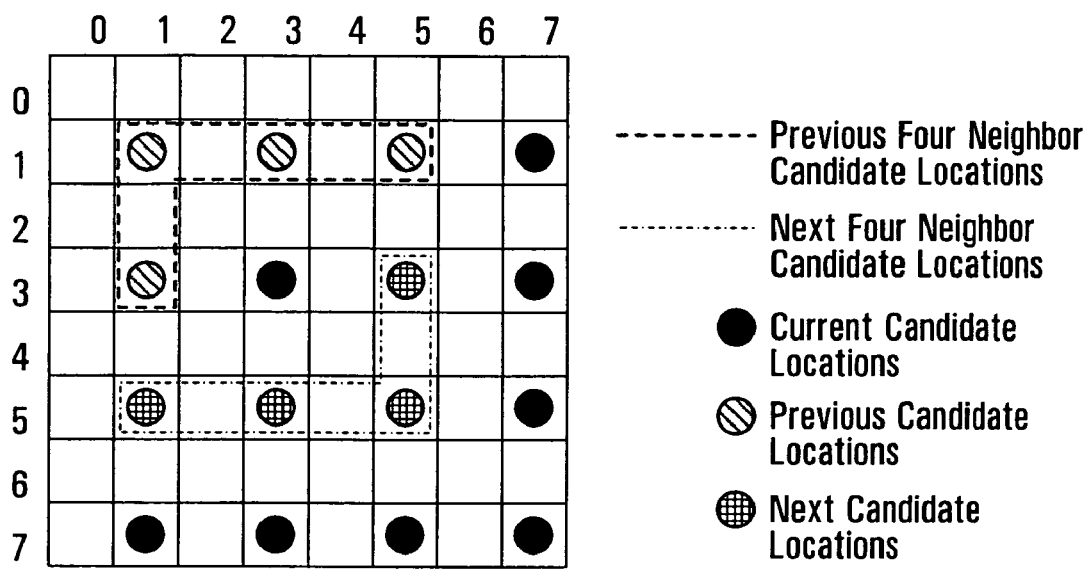
FIG. 19 shows the previous and next four candidate locations.

Once the center pixel is identified as "flippable", it will be flipped and the coefficients that relate to this pixel will be updated. A post-checking may be performed along the main edge direction to make sure that flipping this pixel doesn't affect the "flippability" of its previous four neighboring candidate pixels, e.g., the left neighboring candidate pixel of FIG. 18A. The next four neighboring candidate locations may be considered as "not flippable" if this pixel is "flippable". The watermark data will be embedded by enforcing the odd-even feature of the number of black or white pixels in its corresponding 2×2 or 3×3 blocks. If the center pixel doesn't need to be flipped, flip it back. An illustration of the candidate pixel, its previous and next four neighboring candidates are shown in FIG. 19. The extraction process can perform the same process to determine the "flippablity" of the pixel, conveniently no side information needs to be transmitted in order to extract the hidden information.

Figure 20:
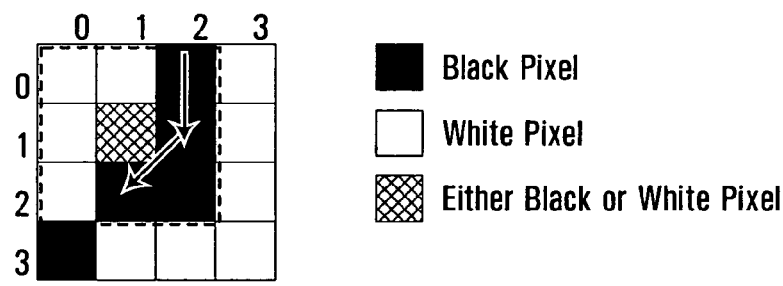
FIG. 20 shows how to extend the determination of the flippability to a 4×4 block.

The current embodiments assess the "flippabilty" of a candidate pixel in 3×3 blocks. For finer visual quality control of the watermarked image, a larger assess block may be considered by further considering the smoothness of the contour. This can be done by checking the basic "flippability" condition in 3×3 block as detailed above, and determining the main edge direction, for example, in FIG. 14A. Further checking is done along the main edge direction in 4×4 or 5×5 larger blocks as is shown in FIG. 20. More rigid constraints should be imposed in order to correctly extract the hidden data like what is imposed for the "end stroke" patterns. Of course, in this case, the capacity will be decreased and the complexity of the method will be increased.

Figure 21:
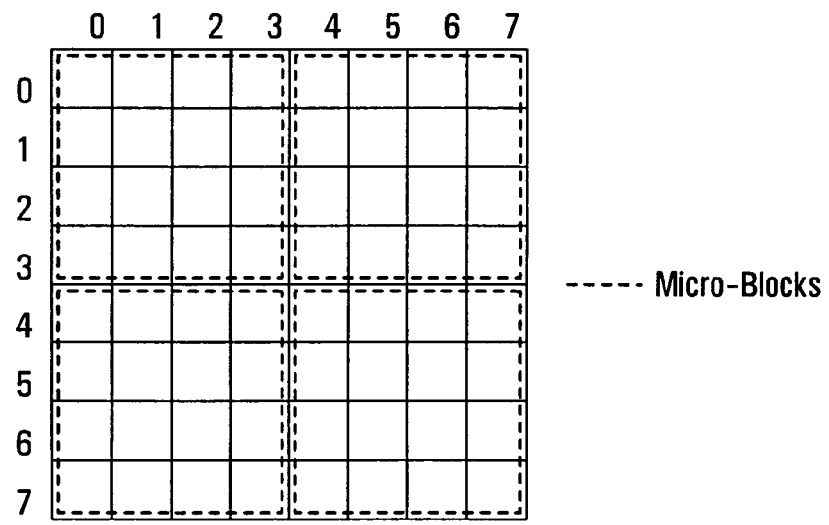
FIG. 21 shows a micro block which is of size 4×4.

The current embodiments hide data in each 2×2 block, however, the consideration is based on 3×3 block. Different variations in implementation of the proposed binary wavelet transform and the lifting transform are possible. For example, the consideration may not need to be 2×2, a group of 2×2 blocks may be grouped together and a micro block size which has row and column dimensions that are both multiples of two may be defined, e.g., 4×4 as is shown in FIG. 21. The data embedding could be based on the block features in this micro-block and features between two "embeddable" micro blocks. In this way, localizing tampers up to the micro block level is possible.

Other variations are also possible. For example, the processing may not be based on 2×2 blocks; it may be processed in row by row (or column by column) sequence. To do so, one first determines if a vertical (or horizontal for column by column processing) edge exists in the designated locations. Then one checks whether the horizontal (or vertical for column by column processing) edge exists. If so,then the "flippablity" of this edge pixel is verified. However, no two candidate pixels should be vertically or horizontally adjacent to each other. This can be shown in FIG. 17, those candidate locations will be checked row by row. All these variations fall within the scope of our invention.

All documents referred to herein, are hereby incorporated by reference herein.

Of course, these described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A computer implemented method of processing a two color image represented as $Y(m,n)$ for watermarking wherein $m<M$, $n<N$, said method comprising:
    designating a plurality of pixels at odd row and odd column coordinates within said two color image as candidate pixels;
    identifying as suitable for storing watermark data by inversion all of said candidate pixels for which,
        one pixel directly above said candidate pixel and one pixel directly below said candidate pixel have different colors; and
        one pixel immediately to the left of said candidate pixel and one pixel immediately to the right of said candidate pixel have different colors, by
    forming a two dimensional array $HL_{oe}(i,j)=Y(2i1, 2j+1) \oplus Y(2i+2, 2j+1)$, having one entry for each of said candidate pixels;
    forming a two dimensional array $HL_{ee}(i,j)=Y(2i, 2j+1) \oplus Y(2i+1, 2j+1)$, having one entry for each of said candidate pixels;
    forming a two dimensional array $LH_{ee}(i,j)=Y(2i+1, 2j) \oplus Y(2i+1, 2j+1)$, having one entry for each of said candidate pixels;
    forming a two dimensional array $LH_{eo}(i,j)=Y(2i+1, 2j+1) \oplus Y(2i+1, 2j2)$, having one entry for each of said candidate pixels;
    assessing values of $(i,j)$ for which $(HL_{ee}(i,j) \oplus HL_{oe}(i,j))^\wedge (LH_{ee}(i,j) \oplus LH_{eo}(i,j))=1$ to identify invertible candidate pixels at locations $(2i+1, 2j+1)$ in said image, wherein i, j, m, n, M, N are positive integers and $2i+2<M$, $2j+2<N$.

2. A method of embedding data in a two color image, comprising:
    locating invertible pixels in said image, at locations $(2i+1, 2j+1)$ of said image, in accordance with claim 1;
    selectively inverting one of said invertible pixels in order to embed a representation of said data in image.

3. The method of claim 2, wherein said representation of said data comprises user data combined with a unique identifier of said image.

4. The method of claim 3, wherein said unique identifier comprises a unique hash value of said image when modified so that each of said invertible pixels has a known value.

5. The method of claim 4, wherein said representation of said data has been encrypted.

6. A method of extracting embedded data in a two color image, comprising:
  locating invertible pixels in said image, at locations ($2i+1$, $2j+1$) of said image, in accordance with claim 1;
  determining values of said invertible pixels in order to extract said embedded data from said image.

7. A computer implemented method of processing a two color image represented as $Y(m,n)$ for watermarking wherein $m<M$, $n<N$, said method comprising:
  designating a plurality of pixels at even row and even column coordinates within said two color image as candidate pixels;
  identifying as suitable for storing watermark data by inversion all of said candidate pixels for which,
    one pixel directly above said candidate pixel and one pixel directly below said candidate pixel have different colors; and
    one pixel immediately to the left of said candidate pixel and one pixel immediately to the right of said candidate pixel have different colors, by
  forming a two dimensional array $HL_{oo}(i-1,j-1)=Y(2i-1, 2j) \oplus Y(2i, 2j)$, having one entry for each of said candidate pixels;
  forming a two dimensional array $HL_{eo}(i,j-1)=Y(2i, 2j) \oplus Y(2i1, 2j)$, having one entry for each of said candidate pixels;
  forming a two dimensional array $LH_{oo}(i-1,j-1)=Y(2i, 2j-1) \oplus Y(2i, 2j)$, having one entry for each of said candidate pixels;
  forming a two dimensional array $LH_{oe}(i-1,j)=Y(2i, 2j) \oplus Y(2i, 2j1)$, having one entry for each of said candidate pixels;
  assessing values of $(i,j)$ for which $(HL_{oo}(i-1, j-1) \oplus HL_{eo}(i, j-1))\char`\^(LH_{oo}(i-1, j-1) \oplus LH_{oe}(i-1, j))=1$ to identify invertible candidate pixels at locations ($2i, 2j$) in said image, wherein i, j, m, n, M, N are positive integers, greater than zero, and $2i+1<M$, $2j+1<N$.

8. A method of embedding data in a two color image, comprising:
  locating invertible pixels in said image, at locations ($2i, 2j$) in accordance with claim 7;
  selectively inverting one of said invertible pixels in order to embed a representation of said data in image.

9. The method of claim 8, wherein said representation of said data comprises said data combined with a unique identifier of said image.

10. The method of claim 9, wherein said unique identifier comprises a unique hash value of said image, modified so that each of said invertible pixels has a known value.

11. The method of claim 10, wherein said representation of said data has been encrypted.

12. A method of extracting embedded data in a two color image, comprising:
  locating invertible pixels in said image, at locations ($2i, 2j$) of said image in accordance with claim 7;
  extracting said embedded data from said image in dependence on values of said invertible pixels.

13. A computer implemented method of processing a two color image represented as $Y(m,n)$ for watermarking wherein $m<M$, $n<N$, said method comprising:
  designating a plurality of pixels at even row and even column coordinates within said two color image as candidate pixels;
    identifying as suitable for storing watermark data by inversion all of said candidate pixels for which,
      one pixel directly above said candidate pixel and one pixel directly below said candidate pixel have different colors; and
      one pixel immediately to the left of said candidate pixel and one pixel immediately to the right of said candidate pixel have different colors, by
    forming a two dimensional array
    $HL_{L\,ee}(i, j)=Y(2i-1,2j) \oplus Y(2i+1,2j)$, having one entry for each of said candidate pixels;
    forming a two dimensional array
    $LH_{L\,ee}(i, j)=Y(2i,2j-1) \oplus Y(2i,2j+1)$, having one entry for each of said candidate pixels;
    assessing values of $(i,j)$ for which $HL_{Lee}(i, j) \oplus LH_{Lee}(i, j)=1$ to identify invertible pixels at locations ($2i, 2j$) in said image, wherein i, j, m, n, M, N are non-zero positive integers and $2i+1<M$, $2j+1<N$.

14. A method of extracting embedded data in a two color image, comprising:
  locating invertible pixels in said image, at locations ($2i, 2j$) of said image and in accordance with claim 13;
  extracting said embedded data from said image in dependence on values of said invertible pixels.

15. A computer implemented method of processing a two color image represented as $Y(m,n)$ for watermarking wherein $m<M$, $n<N$, said method comprising:
  designating a plurality of pixels at odd row and odd column coordinates within said two color image as candidate pixels;
  identifying as suitable for storing watermark data by inversion all of said candidate pixels for which,
    one pixel directly above said candidate pixel and one pixel directly below said candidate pixel have different colors; and
    one pixel immediately to the left of said candidate pixel and one pixel immediately to the right of said candidate pixel have different colors, by
  forming a two dimensional array
  $LH_{L\,OO}(i, j)=Y(2i+1,2j) \oplus Y(2i+1,2j)+2)$, having one entry for each of
  said candidate pixels;
  forming a two dimensional array
  $HL_{L\,OO}(i, j)=Y(2i,2j+1) \oplus Y(2i+2,2j+1)$, having one entry for each of
  said candidate pixels;
  assessing values of $(i,j)$ for which $HL_{LOO}(i, j) \oplus LH_{LOO}(i, j)=1$ to identify invertible candidate pixels at locations ($2i+1, 2j+1$) in said image, wherein 1, 1, m, n, M, N are integers and $2i+2<M$, $2j+2<N$.

16. A method of extracting embedded data in a two color image, comprising:
  locating invertible pixels in said image, at locations ($2i+1$, $2j+1$) of said image in accordance with claim 15;
  extracting said embedded data from said image in dependence on values of said invertible pixels.

17. A computer implemented method of processing a two color image represented as $Y(m,n)$ for watermarking wherein $m<M$, $n<N$, said method comprising:
  designating a plurality of pixels at odd row and odd column coordinates, and at even row and even column coordinates within said two color image as candidate pixels;
  identifying as suitable for storing watermark data by inversion all of said candidate pixels for which,
    one pixel directly above said candidate pixel and one pixel directly below said candidate pixel have different colors, and one pixel immediately to the left of said candidate pixel and one pixel immediately to the right of said candidate pixel have different colors, by forming a two dimensional array $HL_{L\ ee}(i,j)=Y(2i-1,2j) \oplus Y(2i+1,2j)$, having one entry for each of said candidate pixels;

forming a two dimensional array $LH_{L\ ee}(i,j)=Y(2i,2j-1) \oplus Y(2i,2j+1)$, having one entry for each of said candidate pixels;

forming a two dimensional array $LH_{L\ OO}(i,j)=Y(2i+1,2+j) \oplus Y(2i+1,2j+2)$, having one entry for each of said candidate pixels;

forming a two dimensional array $HL_{L\ OO}(i,j)=Y(2i,2j+1) \oplus Y(2i+2,2j+1)$, having one entry for each of said candidate pixels;

assessing values of (i,j) for which $HL_{LOO}(i,j) \oplus LH_{LOO}(i,j)=1$; or $HL_{Lee}(i,j) \oplus LH_{Lee}(i,j)=1$ to identify candidate pixels at locations (2i, 2j) and (2i+1, 2j+1) within said image that are invertible, wherein i, j, m, n, M, N are non-zero, positive integers and 2i+2<M, 2j+2<N.

18. A method of extracting embedded data in a two color image, comprising:

locating invertible pixels in said image, at locations (2i,2j) and (2i+1, 2j+1) of said image in accordance with claim 17;

extracting said embedded data from said image in dependence on values of said invertible pixels.

19. A method of embedding data in a two color image, comprising:

locating invertible pixels in said image, at locations in accordance with claim 17;

selectively inverting ones of said invertible pixels in order to embed a representation of said data in image, wherein the ones of said invertible pixels that are inverted are further chosen in dependence on a random key.

20. The method of claim 19, further comprising excluding inverting more than one pixel in each 2×2 block of said image.

21. A computer implemented method of processing a two color image represented as Y(m,n) for watermarking wherein m<M, n<N, said method comprising:

designating a plurality of pixels at odd row and even column coordinates within said two color image as candidate pixels;

identifying as suitable for storing watermark data by inversion all of said candidate pixels for which, one pixel directly above said candidate pixel and one pixel directly below said candidate pixel have different colors, and one pixel immediately to the left of said candidate pixel and one pixel immediately to the right of said candidate pixel have different colors, by forming a two dimensional array $HL_{Leo}(i,j)=Y(2i-1,2j+1) \oplus Y(2i+1,2j+1)$, having one entry for each of said candidate pixels;

forming a two dimensional array $LH_{Leo}(i,j)=Y(2i,2j) \oplus Y(2i,2j+2)$, having one entry for each of said candidate pixels;

assessing values of (i,j) for which $HL_{Leo}(i,j) \oplus LH_{Leo}(i,j)=1$ to identify invertable pixels at locations (2i, 2j+1) in said image, wherein i, j, m, n, M, N are non-negative integers and 2k<M, 2j+2<N.

22. A method of extracting embedded data in a two color image, comprising:

locating invertible pixels in said image, at locations (2i, 2j+1) of said image in accordance with claim 21;

extracting said embedded data from said image in dependence on values of said invertible pixels.

23. A computer implemented method of processing a two color image represented as Y(m,n) for watermarking wherein m<M, n<N, said method comprising:

designating a plurality of pixels at even row and odd column coordinates within said two color image as candidate pixels:

identifying as suitable for storing watermark data by inversion all of said candidate pixels for which, one pixel directly above said candidate pixel and one pixel directly below said candidate pixel have different colors, and one pixel immediately to the left of said candidate pixel and one pixel immediately to the right of said candidate pixel have different colors, by forming a two dimensional array $LH_{Loe}(i,j)=(Y(2i+1,2j-1) \oplus Y(2i+1,2j+1))$, having one entry for each of said candidate pixels;

forming a two dimensional array $HL_{Loe}(i,j)=(Y(2i,2j) \oplus Y(2i+2,2j))$, having one entry for each of said candidate pixels;

assessing values of (i,j) for which $HL_{Loe}(i,j) \oplus LH_{Loe}(i,j)=1$ to assess if candidate pixels at locations (2i+1, 2j) are invertible, wherein i, j, m, n, M, N are non-negative integers and 2i+1<M, 2j+1<N.

24. A method of extracting embedded data in a two color image, comprising:

locating invertible pixels in said image, at locations (2i+1, 2j) in accordance with claim 23;

extracting said embedded data from said image in dependence on values of said invertible pixels.

25. A computer implemented method of processing a two color image represented as Y(m,n) for watermarking wherein m<M, n<N, said method comprising:

designating a plurality of pixels at odd row and even column coordinates, and at even row and odd column coordinates within said two color image as candidate pixels;

identifying as suitable for storing watermark data by inversion all of said candidate pixels for which, one pixel directly above said candidate pixel and one pixel directly below said candidate pixel have different colors, and one pixel immediately to the left of said candidate pixel and one pixel immediately to the right of said candidate pixel have different colors, by forming a two dimensional array $LH_{Loe}(i,j)=(Y(2i+1,2j-1) \oplus Y(2i+1,2j+1))$, having one entry for each of said candidate pixels;

forming a two dimensional array $HL_{Loe}(i,j)=(Y(2i,2j) \oplus Y(2i+2,2j))$, having one entry for each of said candidate pixels;

forming a two dimensional array $HL_{Leo}(i,j)=Y(2i-1,2j+1) \oplus Y(2i+1,2j+1)$, having one entry for each of said candidate pixels;

forming a two dimensional array $LH_{Leo}(i,j)=Y(2i,2j) \oplus Y(2i,2j+2)$, having one entry for each of said candidate pixels;

assessing values of (i,j) for which $HL_{Leo}(i,j) \oplus LH_{Leo}(i,j)=1$ or for for which $HL_{Loe}(i,j) \oplus (i,j)=1$ to assess if pixels at locations (2i, 2j+1) and (2i+1, 2j) in said image may be inverted, wherein i, j, m, n, M, N are positive, non-zero integers and 2i+2<M, 2j+2<N.

26. A method of extracting embedded data in a two color image, comprising:

locating invertible pixels in said image, at locations (2i,2j+1) and (2i+1, 2j) of said image in accordance with claim 25;

extracting said embedded data from said image in dependence on values of said invertible pixels.

27. A method of embedding data in a two color image, comprising:
  locating invertible pixels in said image, at locations in accordance with claim 25;
  selectively inverting ones of said invertible pixels in order to embed a representation of said data in image;
  wherein the ones of said invertible pixels that are inverted are further chosen in dependence on a random key.

28. The method of claim 27, further comprising excluding inverting more than one pixel in each 2×2 block of said image.

29. A method of embedding data in a two color image, comprising:
  locating invertible pixels in said image, in accordance with claim 17;
  selectively inverting ones of said invertible pixels in order to embed a representation of said data in image.

30. Computer readable medium storing processor executable instructions, that when loaded at a computing device comprising a processor and memory, adapt said computing device to perform the method of claim 1.

31. Computer readable medium storing processor executable instructions, that when loaded at a computing device comprising a processor and memory, adapt said computing device to perform the method of claim 17.

32. The method of claim 1, further comprising determining which of said pixels identified as invertible forms the center of a 3×3 block having 5 dark pixels and forming $S_S(i, j)$ for each such pixel where, $$\begin{aligned}
&\text{if } (HL_{ee}(i,j) = 1) \wedge (LH_{ee}(i,j) = 1) \wedge (HH_{oo}(i,j) = 0) \\
&\quad S_s(i,j) = 1; \\
&\text{elseif } (HL_{oe}(i,j) = 1) \wedge (LH_{ee}(i,j) = 1) \wedge (HH_{eo}(i,j) = 0) \\
&\quad S_s(i,j) = 1; \\
&\text{elseif } (HL_{ee}(i,j) = 1) \wedge (LH_{eo}(i,j) = 1) \wedge (HH_{oe}(i,j) = 0) \\
&\quad S_s(i,j) = 1; \\
&\text{elseif } (HL_{oe}(i,j) = 1) \wedge (LH_{eo}(i,j) = 1) \wedge (HH_{ee}(i,j) = 0) \\
&\quad S_s(i,j) = 1; \\
&\text{endif}
\end{aligned}$$

and excluding any pixels for which $Ss(i, j)=1$ from those pixels identified as invertible.

33. The method of claim 32, further comprising determining which of said pixels identified as invertible forms the center of a 3×3 block having 6 black pixels and forming $S_S(i, j)$ for each such pixel where, $$\begin{aligned}
&\text{if } (HL_{ee}(i,j) = 1) \wedge (LH_{ee}(i,j) = 1) \wedge (HH_{ee}(i,j) = 1) \\
&\quad S_s(i,j) = 1; \\
&\text{elseif } (HL_{oe}(i,j) = 1) \wedge (LH_{ee}(i,j) = 1) \wedge (HH_{oe}(i,j) = 1) \\
&\quad S_s(i,j) = 1; \\
&\text{elseif } (HL_{ee}(i,j) = 1) \wedge (LH_{eo}(i,j) = 1) \wedge (HH_{eo}(i,j) = 1) \\
&\quad S_s(i,j) = 1; \\
&\text{elseif } (HL_{oe}(i,j) = 1) \wedge (LH_{eo}(i,j) = 1) \wedge (HH_{oo}(i,j) = 1) \\
&\quad S_s(i,j) = 1; \\
&\text{endif}
\end{aligned}$$

and excluding any pixels for which $Ss(i, j)=1$ from those pixels identified as invertible.

34. The method of claim 17, wherein said identifying further comprises identifying only ones of said candidate pixels that are not directly above, directly below or directly beside a candidate pixel already identified as invertible.

35. The method of claim 17, wherein at most one of said candidate pixels is located in each 2×2 block of pixels of said image.

36. The method of claim 17, wherein each of said candidate pixels is spaced horizontally and vertically by at least one pixel from another one of said candidate pixels within said image.

37. The method of claim 34, further comprising designating pixels within said image as candidate pixels based on a random key.

38. The method of claim 17 wherein said image is divided into blocks smaller in size than said image in which, and wherein payload watermark data is embedded in each of said blocks independently.

* * * * *

UNITED STATES PATENT AND TRADEMARK OFFICE
CERTIFICATE OF CORRECTION

PATENT NO. : 7,688,993 B2
APPLICATION NO. : 11/256276
DATED : March 30, 2010
INVENTOR(S) : Kot et al.

It is certified that error appears in the above-identified patent and that said Letters Patent is hereby corrected as shown below:

Col. 24, Line 37, Claim 1 "Y(2il, 2j+l)" should read --Y(2i+1, 2j+l)--;

Col. 24, Line 48, Claim 1 "Y(2i+1, 2j2)" should read --Y(2i+1, 2j+2)--;

Col. 25, Line 26, Claim 7 "Y(2il, 2j)" should read --Y(2i+1, 2j)--;

Col. 25, Line 32, Claim 7 "Y(2i, 2j1)" should read --Y(2i, 2j+1)--;

Col. 26, Line 39, Claim 15 "Y(2i+1,2j)+2)" should read --Y(2i + 1,2j + 2)-;

Col. 26, Line 48, Claim 15 "wherein 1, 1," should read --wherein i, j,--;

Col. 27, Line 11, Claim 17 "=Y(2i+1, 2+j)" should read --=Y(2i+1, 2j)--;

Col. 27, Line 61, Claim 21 "2k<M" should read --2i<M--; and

Col. 28, Line 58, Claim 25 "⊕ (i, j,)" should read --⊕ LH$_{Loe}$(i j)--.

Signed and Sealed this

Sixteenth Day of November, 2010

David J. Kappos
*Director of the United States Patent and Trademark Office*